(12) United States Patent
Yamada et al.

(10) Patent No.: US 6,390,500 B1
(45) Date of Patent: May 21, 2002

(54) AIRBAG APPARATUS, FOLDING METHOD FOR AIRBAG, AND FOLDING APPARATUS FOR AIRBAG

(75) Inventors: Satoshi Yamada; Nakao Takayanagi; Masami Tonooka; Satoshi Kitazawa; Takashi Ueda, all of Fuji (JP)

(73) Assignee: Nihon Plast Co., Ltd., Shizuoka-ken (JP)

( * ) Notice: Subject to any disclaimer, the term of this patent is extended or adjusted under 35 U.S.C. 154(b) by 0 days.

(21) Appl. No.: 09/340,970

(22) Filed: Jun. 28, 1999

(30) Foreign Application Priority Data

| Jun. 30, 1998 | (JP) | ............................................ 10-185436 |
| Jul. 1, 1998 | (JP) | ............................................ 10-186378 |
| Aug. 7, 1998 | (JP) | ............................................ 10-224883 |

(51) Int. Cl.⁷ .............................................. B60R 21/16
(52) U.S. Cl. ..................................... 280/743.1; 280/732
(58) Field of Search .......................... 280/743.1, 743.2, 280/731, 732

(56) References Cited

U.S. PATENT DOCUMENTS

| 5,140,799 A | * | 8/1992 | Satoh |
| 5,178,407 A | * | 1/1993 | Kelley |
| 5,398,968 A | * | 3/1995 | Emambakhsh et al. |
| 5,460,403 A | | 10/1995 | Hansen |
| 5,472,233 A | * | 12/1995 | Horiuchu et al. |
| 5,492,367 A | * | 2/1996 | Albright et al. |
| 5,493,846 A | * | 2/1996 | Baker et al. |
| 5,531,477 A | * | 7/1996 | Madrigal et al. |
| 5,746,690 A | | 5/1998 | Humbarger et al. |
| 5,775,724 A | * | 7/1998 | Tonooka et al. ............. 108/143 |
| 5,957,486 A | * | 9/1999 | Taguchi et al. |
| 5,992,882 A | * | 11/1999 | Ito et al. |
| 6,029,996 A | * | 2/2000 | Yoshioka et al. |

FOREIGN PATENT DOCUMENTS

| DE | 4343026 | 6/1994 |
| DE | 19625109 | 12/1997 |
| JP | 4-100754 | 4/1992 |
| JP | 6-048261 | 2/1994 |
| JP | 6-087392 | 3/1994 |
| JP | 6-227353 | 8/1994 |
| JP | 6-55896/1994 | 8/1994 |
| JP | 2709024 B2 | 2/1998 |
| JP | 10-218484 | 8/1998 |

* cited by examiner

Primary Examiner—Brian L. Johnson
Assistant Examiner—Joselynn Y. Sliteris
(74) Attorney, Agent, or Firm—Kilpatrick Stockton LLP

(57) ABSTRACT

A bag-like airbag is folded into a substantially T-shape having a first developing portion which is continuous with an opening from which gas flows in and second developing portions extending fore-and-aft direction from an upper end of the first developing portion. Each of the second developing portions is folded into a bellows toward a prescribed point, thereby forming an aggregate. The aggregate is rotated, the first developing portion is wound around the aggregate, and the folded airbag is accommodated in an airbag accommodation portion of a retainer.

2 Claims, 25 Drawing Sheets

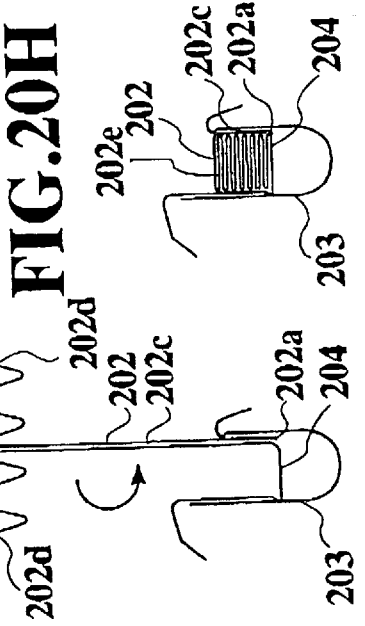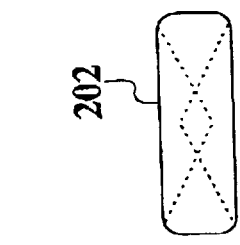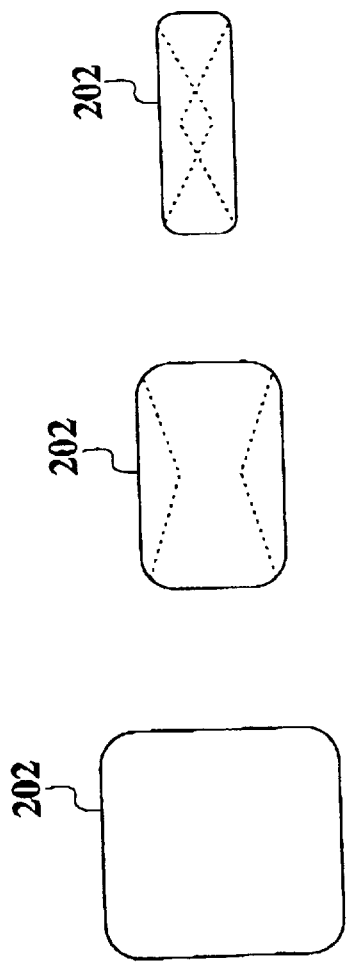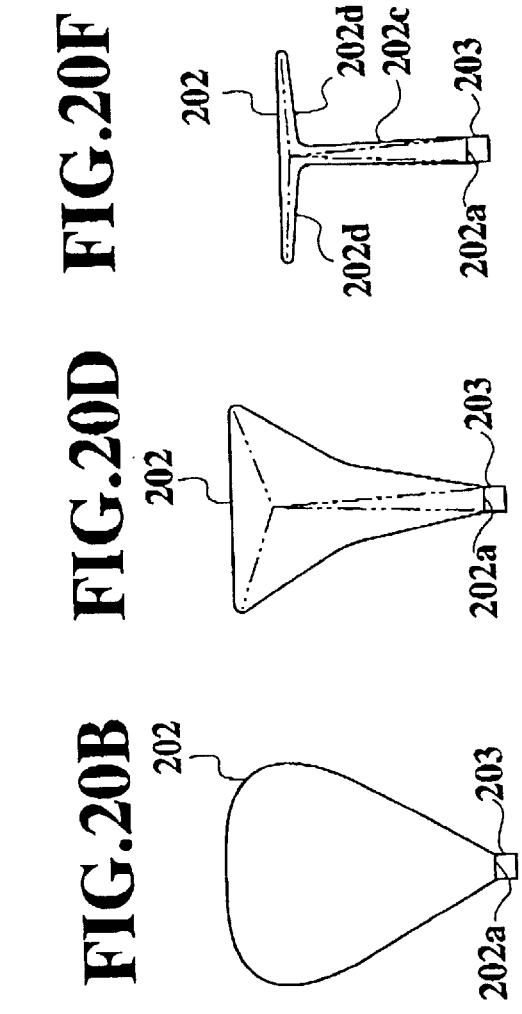

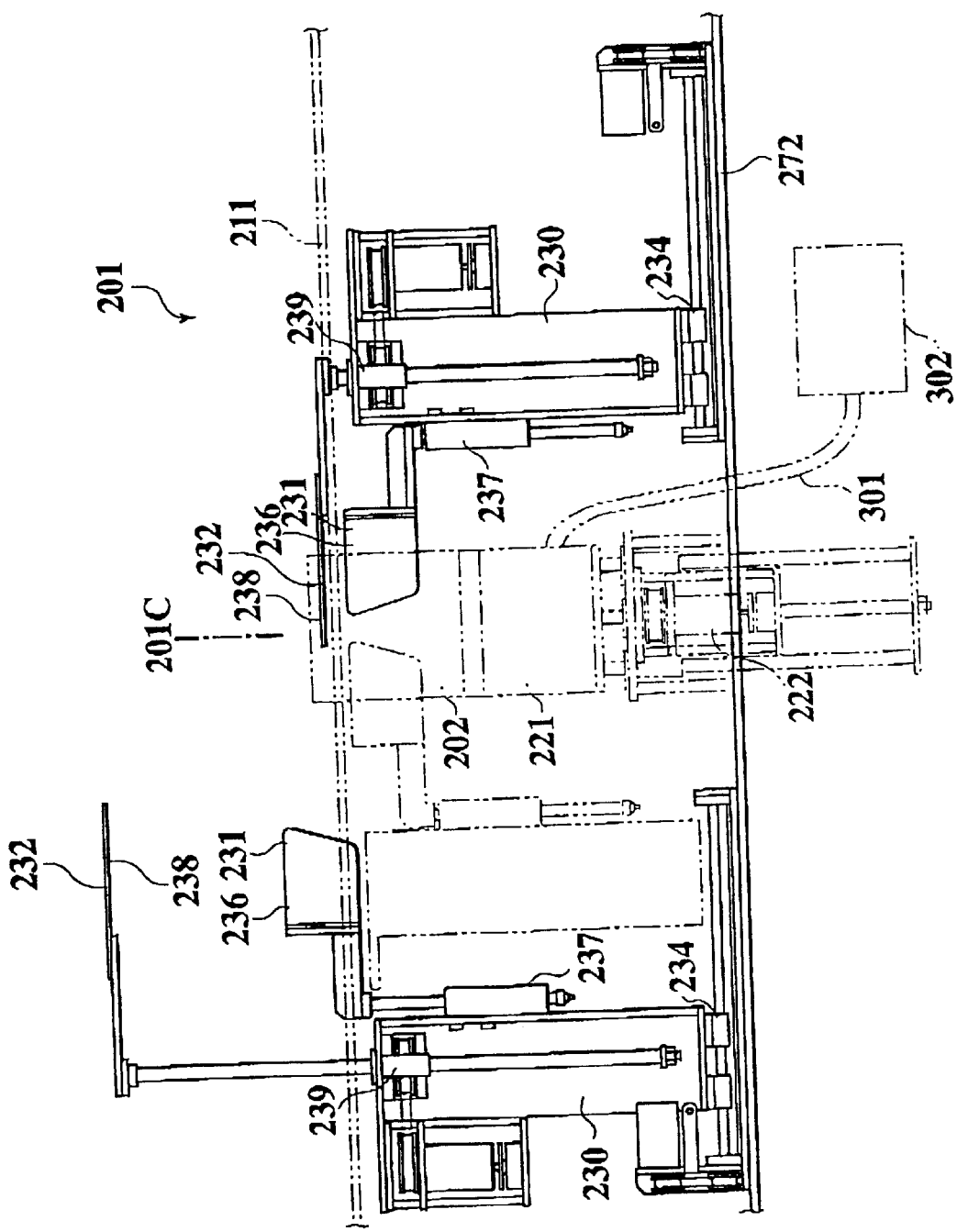

AIRBAG APPARATUS, FOLDING METHOD FOR AIRBAG, AND FOLDING APPARATUS FOR AIRBAG

BACKGROUND OF THE INVENTION

The present invention relates to an airbag apparatus for an automobile, a folding method of an airbag, and a folding apparatus of an airbag.

An airbag used for an airbag apparatus for a passenger-side airbag apparatus of an automobile is described in Japanese Patent Publication No. 2709024, Japanese Patent Publication No. 2652751, Japanese Patent Application Laid-open No. H4-100754 and the like. A folding apparatus of an airbag is described in Japanese Patent Application Laid-open No. H6-48261 and Japanese Utility Model Application Laid-open No. H6-55896.

SUMMARY OF THE INVENTION

An airbag Is required to smoothly and swiftly expand and develop to effectively moderate an impact of a collision applied to an occupant, and to reduce the pressure applied to the occupant from the airbag itself.

A folding apparatus of an airbag Is required to smoothly fold an airbag at high speed, and to fold the airbag such that excellent developing performance can be secured.

It is an object of the present invention to provide an airbag apparatus for an automobile, a folding method of an airbag, and a folding apparatus of an airbag which satisfy the above-mentioned requirements.

To achieve the above object, a first mode of an airbag apparatus of the present invention includes a bag-like airbag and a case body. The airbag is developed by flowing-in of gas. The case body includes an airbag accommodation portion and a projection port. The airbag is folded and accommodated in the airbag accommodation portion. The folded airbag develops by pressing is developed through the projection port. The folded airbag includes a first developing portion and an aggregate. The first developing portion includes one end connected to the case body. The aggregate comprises second developing portions extending from the other end of the first developing portion. The second developing portions of the aggregate are gathered toward the other end of the first developing portion.

With the above arrangement, when gas is supplied into the airbag folded and accommodated in the airbag accommodation portion of the case body, the gas is first introduced into the first developing portion. By the flowing-in of the gas, the first developing portion is developed and the aggregate projects from the projection port by a predetermined amount. Subsequently, the gas is introduced into each of the second developing portions constituting the aggregate through the first developing portion, and each of the second developing portions is developed. The plurality of second developing portions are provided in the aggregate and when each of the second developing portions is developed, the aggregate projects outside the case body. Therefore, the aggregate is developed smoothly substantially in the entire circumferential direction substantially around a predetermined point. For this reason, when the aggregate is developed, the developing speeds of various portions of the airbag is uniformed, and airbag is restrained from being partially developed at high speed.

The first developing portion may be wound around an outer periphery of the aggregate.

With the above arrangement, when the gas is introduced into the folded airbag, the first developing portion projects from the protection port while being rewound. Therefore, it is possible to allow the airbag to incline and project from the projection port, and for example, it is possible to allow the aggregate to project in a direction away from an object to be protected.

A second mode of the airbag apparatus of the invention includes a bag-like airbag and a case body. The airbag is developed by flowing-in of gas. The case body includes an airbag accommodation portion and a projection port. The airbag is folded and accommodated in the airbag accommodation portion. The folded airbag develops by passing through the projection port. The airbag is developed in two stages. The airbag in a first stage projects to a prescribed point away from the projection port. The airbag in a second stage is developed around the prescribed point.

With the above arrangement, at the time of development, the airbag can be smoothly developed substantially around the prescribed point away from the projection port in a state in which the airbag projects from the projection port by a predetermined amount.

In a first mode of a folding method of an airbag of the invention, the airbag is first folded into a shape including a first developing portion and second developing portions. The first developing portion is provided at its one end with an opening. Each of the second developing portions extends from the other end of the first developing portion. Next, the second developing portions are gathered toward the other end of the first developing portion to form an aggregate.

A second mode of the folding method of the airbag of the invention comprises the following four steps. In a first step, the airbag is held such that the opening is directed downward. In a second step, the inside of the airbag is pressurized to expand the airbag upward in substantially vertical direction. In a third step, the airbag is folded into a substantially T-shape including a first and two second developing portions. The first and second developing portions are formed by pushing the expanded airbag from the outside and folding portions thereof inward. The first developing portion has a flat-plate shape extending in substantially vertical direction from an opening of one end of the first developing portion. Each of the second developing portions has a flat-plate shape extending substantially horizontal direction from the other end of the first developing portion. Each of the first and second developing portions is folded into a width capable of being accommodated in an airbag accommodation portion. In a fourth step, the second developing portions are folded and superposed on the other end of the first developing portion, thereby forming an aggregate.

The first developing portion may be wound around an outer periphery of the aggregate.

Each of the first and second developing portions may be folded into a width which can be accommodated in the airbag accommodation portion, and the aggregate may be formed by folding the second developing portion and superposing the folded second developing portions on the other end of the first developing portion. With this arrangement, the aggregate can be formed easily, and the producing cost of the airbag is reduced. In this case, the aggregate can be formed easier by forming the first and second developing portions into the plate-like shape.

Each of the second developing portions may be folded into the corrugate shape. With this arrangement, the developing characteristics of the airbag can be enhanced.

The length of the second developing portions may be different from the length of the first developing portion. With this arrangement, a desired developed shape of the airbag can be obtained.

Each of the second developing portions may have an upward developing portion to be developed upward and a downward developing portion to be developed downward. When the second developing portions are developed, the downwardly developing portions may project greater than the upward developing portions.

When the airbag apparatus is disposed in the instrument panel of an automobile, a lower space of the airbag apparatus (space between the airbag apparatus and the passenger) is greater than an upper space of the airbag apparatus (space between the airbag apparatus and the front glass). According to the above folding method, the airbag can be smoothly developed such as to excellently fill both the upper and lower spaces.

A first mode of the airbag folding apparatus of the invention includes first and second corrugating units. The first and second corrugating units are respectively disposed on one and the other surfaces of the airbag folded into a flat-plate shape, and are opposed to each other. The first and second corrugating units respectively includes first and second folding bodies, first and second link means and first and second driving means. Each of the first folding bodies includes a first abutment portion, and each of the second folding bodies includes a second abutment portion. Each of the link means connects the corresponding folding bodies to each other. Each of the driving means drives at least one of the corresponding folding bodies and the link means The first abutment portions are arranged at a predetermined distance, and advance and retreat with respect to the one surface of the airbag by the first driving means. The second abutment portions are arranged at a predetermined distance and advance and retreat with respect to the other surface of the airbag by the second driving means. When both the first and second abutment portions advance, the first abutment portion comes in contact with and pushes the one surface of the airbag, and the second abutment portion comes in contact with and pushes the other surface of the airbag. With this operation, one of the abutment portions is inserted between the other abutment portions, and the airbag is bent into the corrugate shape between the first and second abutment portions.

With the above arrangement, when the abutment portions of the plurality of folding bodies of the first and second corrugating units disposed on both surfaces of the airbag such as to oppose to each other approach each other, the abutment portion of each of the corrugating units advances toward the airbag, and the airbag is folded into the corrugate shape. In this folding process, each of the abutment portion is moved while the predetermined point of the airbag is held, the sliding contact between the abutment portion and the airbag is restrained and thus, a force is restrained from being applied, and the speedup of the folding operation is possible. Since the folding bodies are connected to each other by the link means, the folding bodies are associatively moved with respect to each other, and the driving means can be omitted. Therefore, the structure of the apparatus can be simplified, and the producing cost of the apparatus can be reduced.

At least one of the first and second link means may be formed into a pantagraph shape.

A second mode of the airbag folding apparatus of the invention includes first developing portion holding means, second developing portion folding means and aggregate folding means. The first developing portion folding means folds a portion of the airbag which is continuous with the opening and forms the first developing portion. The first developing portion is provided at its one end with the opening. The second developing portion folding means folds a portion of the airbag which is continuous with the first developing portion and forms a plurality of flat plate like second developing portions. Each of the second developing portions extends from the other end of the first developing portion. The aggregate folding means fold the second developing portions and superpose the latter on the other end of the first developing portion, thereby forming the aggregate.

The aggregate folding means may have the first and second corrugating units of the first mode.

The second mode of the folding apparatus may further have airbag holding means, and a mounting member may be mounted to the opening of the airbag. The airbag holding means holds the mounting member in a state in which the opening is directed downward, pressurizes the inside of the airbag to expand the latter upward in substantially vertical direction, thereby stabilizing the airbag in position. The first developing portion folding means may have a first developing portion restriction plate. The first developing portion restriction plate pushes the expanded bag from the outside and folds the latter inward, thereby forming the first developing portion having a substantially vertical plate shape. The second developing portion folding means may have a second developing portion restriction plate. The second developing portion restriction plate pushes the expanded airbag from the outside and folds the latter inward, thereby forming the second developing portion having the substantially horizontal flat plate shape.

With the above arrangement, it is possible to mechanize the folding operation of the airbag having excellent developing characteristics that when the gas flows in, the first developing portion first develops and then, the second developing portions develop and, the producing cost is reduced. Further, since the inside of the airbag is pressurized and expanded in a state in which the opening to which the mounting member is mounted is directed downward, and the airbag is stabilized in position, the operation of attaching and detaching the airbag is improved.

Figure 13A:
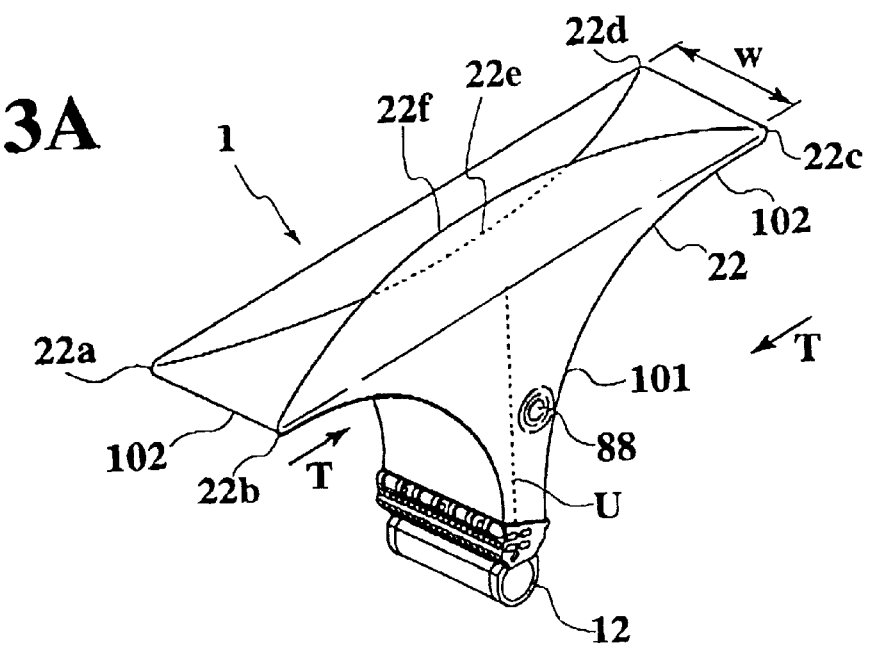
FIG. 13A is an explanatory view showing a folding procedure according to another embodiment.
Figure 13B:
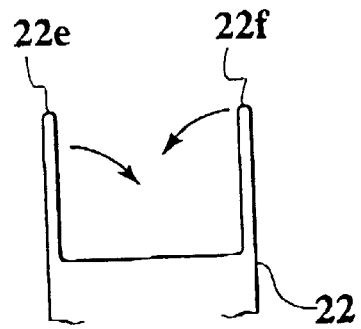
FIG. 13B is a sectional view of a portion of the folding procedure shown in FIG. 13A.
Figure 14A:
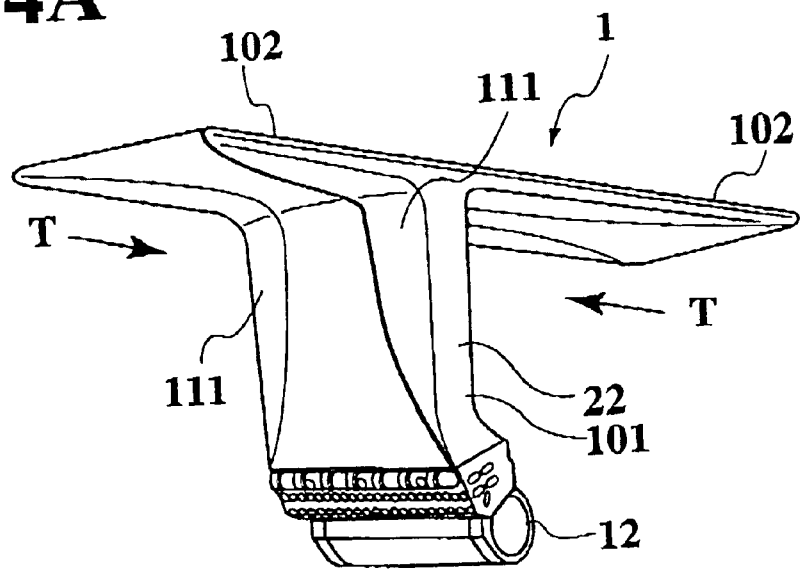
Figure 14B:
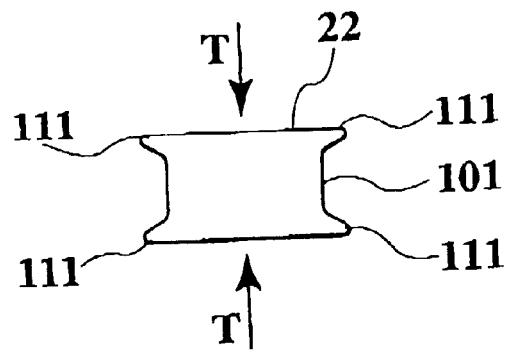
Figure 14C:
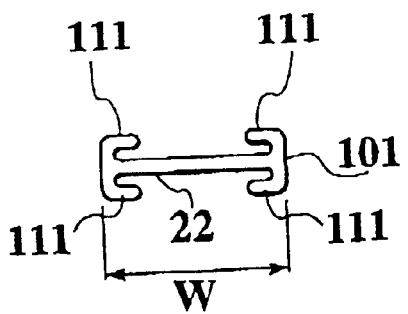
Figure 15:
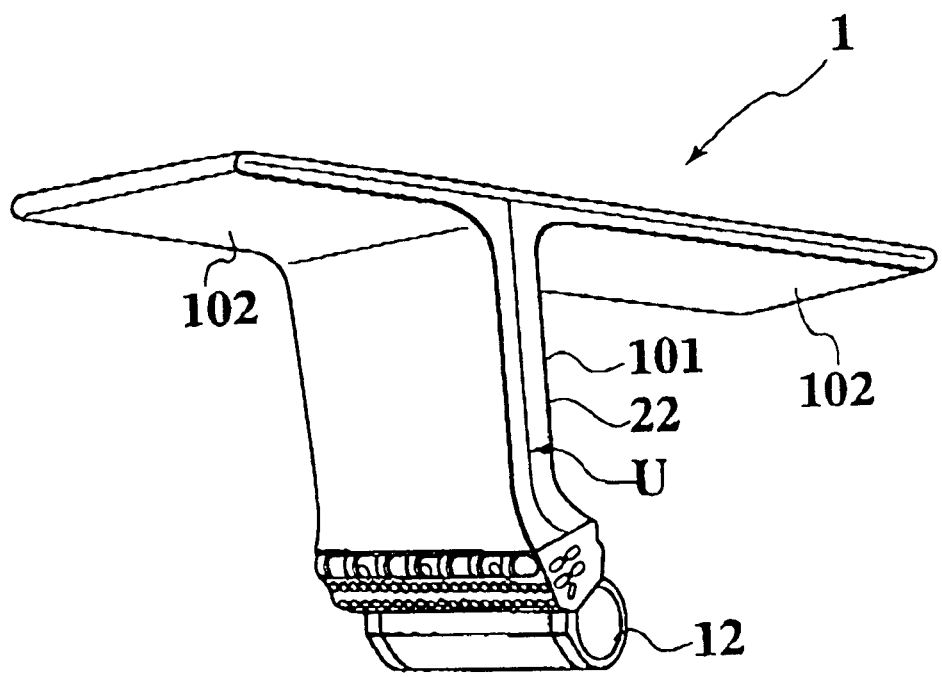
Figure 16A:
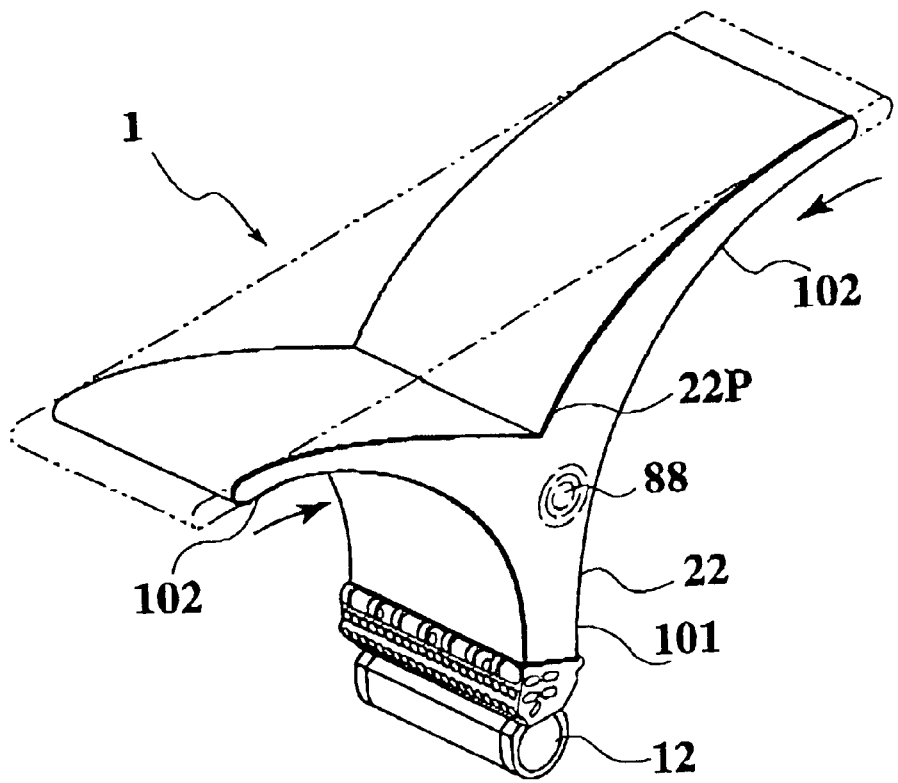
Figure 16B:
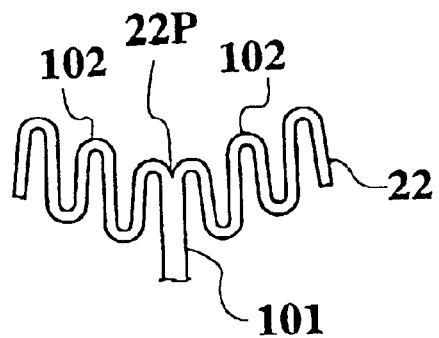
Figure 17:
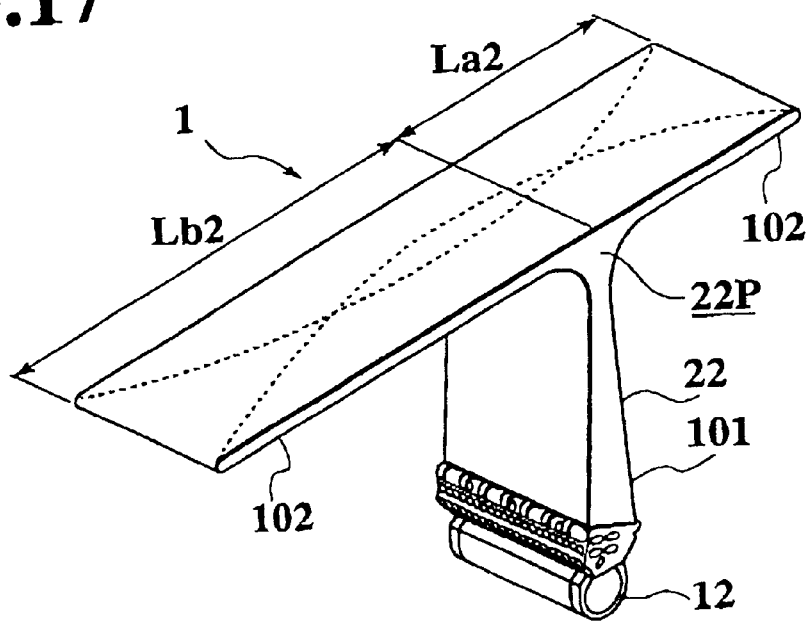
Figure 18:
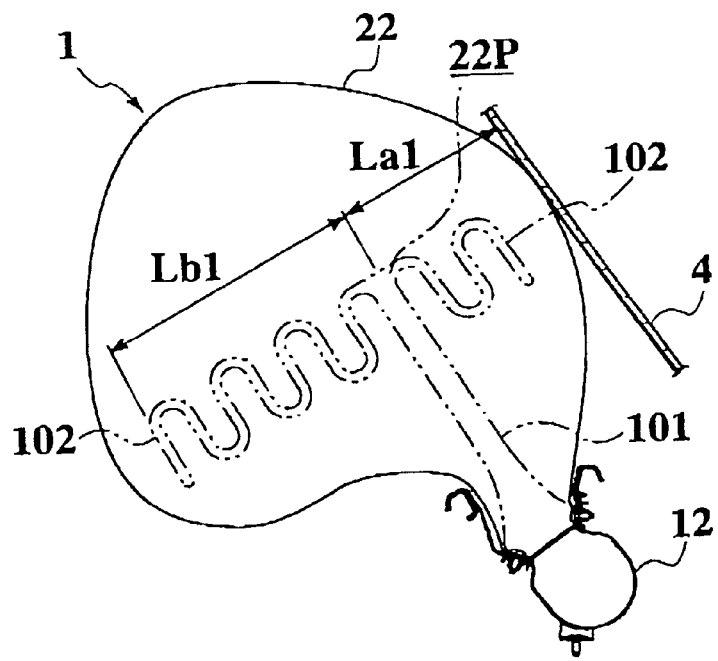
Figure 19:
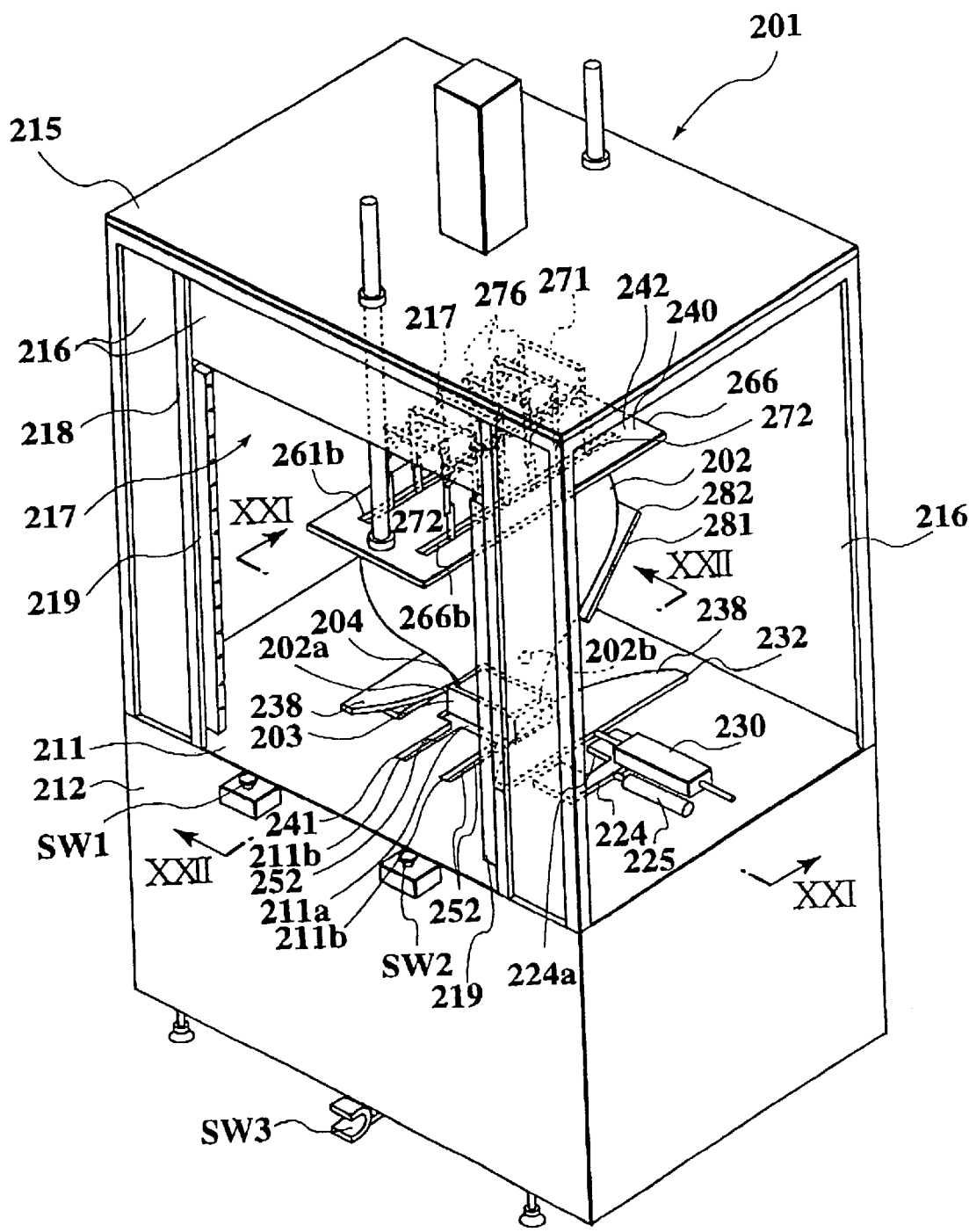
Figure 22:
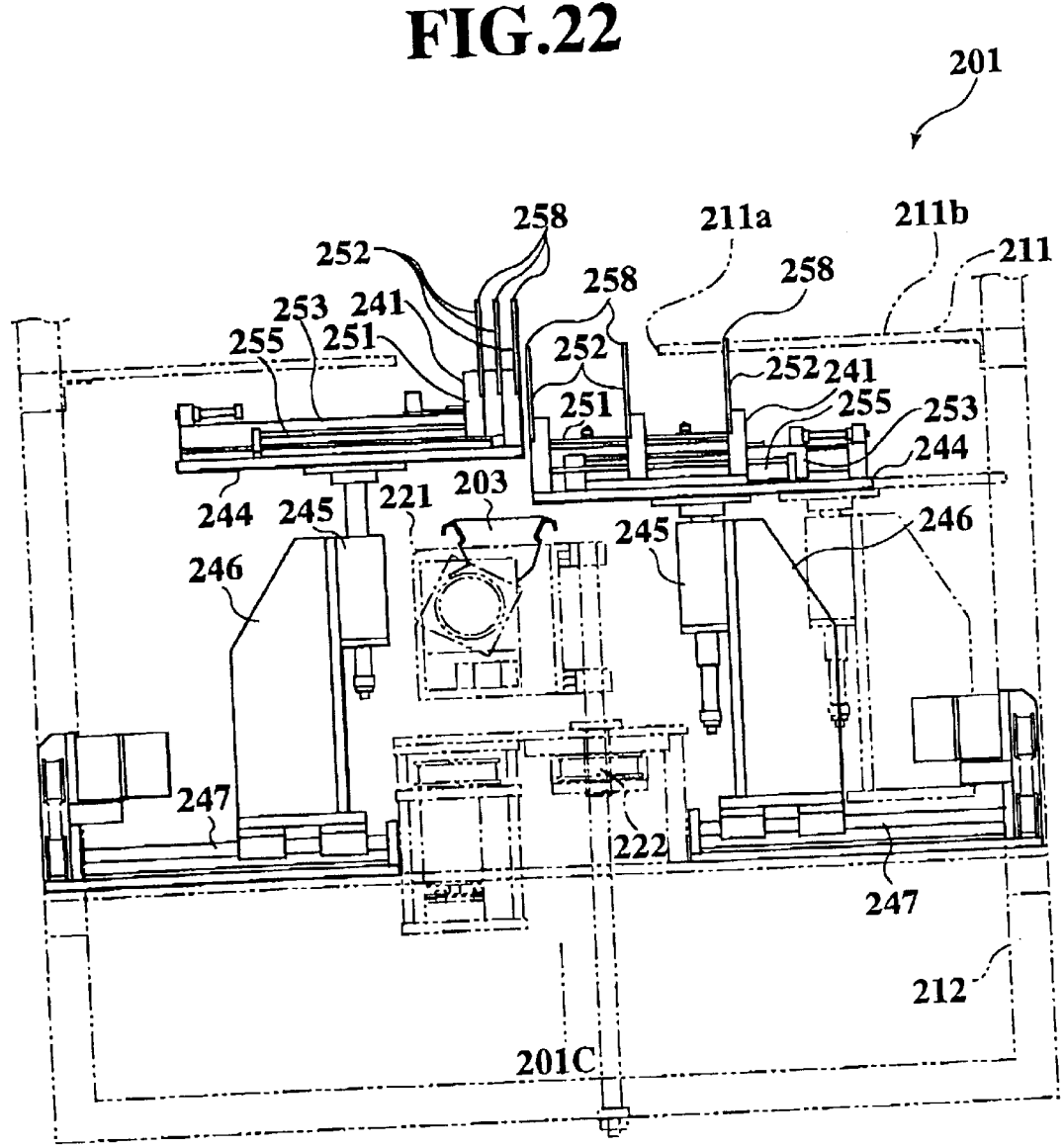
Figure 23:
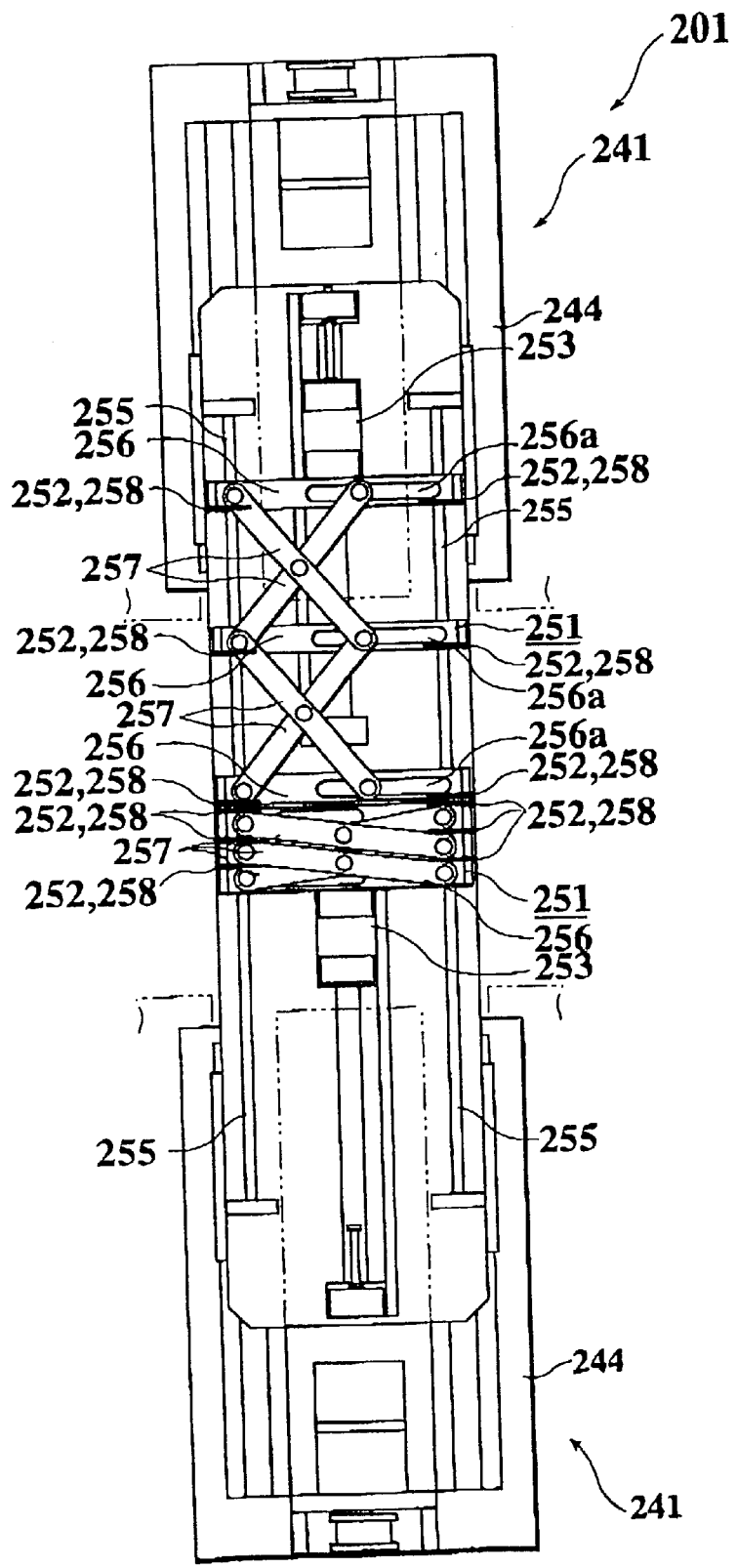
Figure 24:
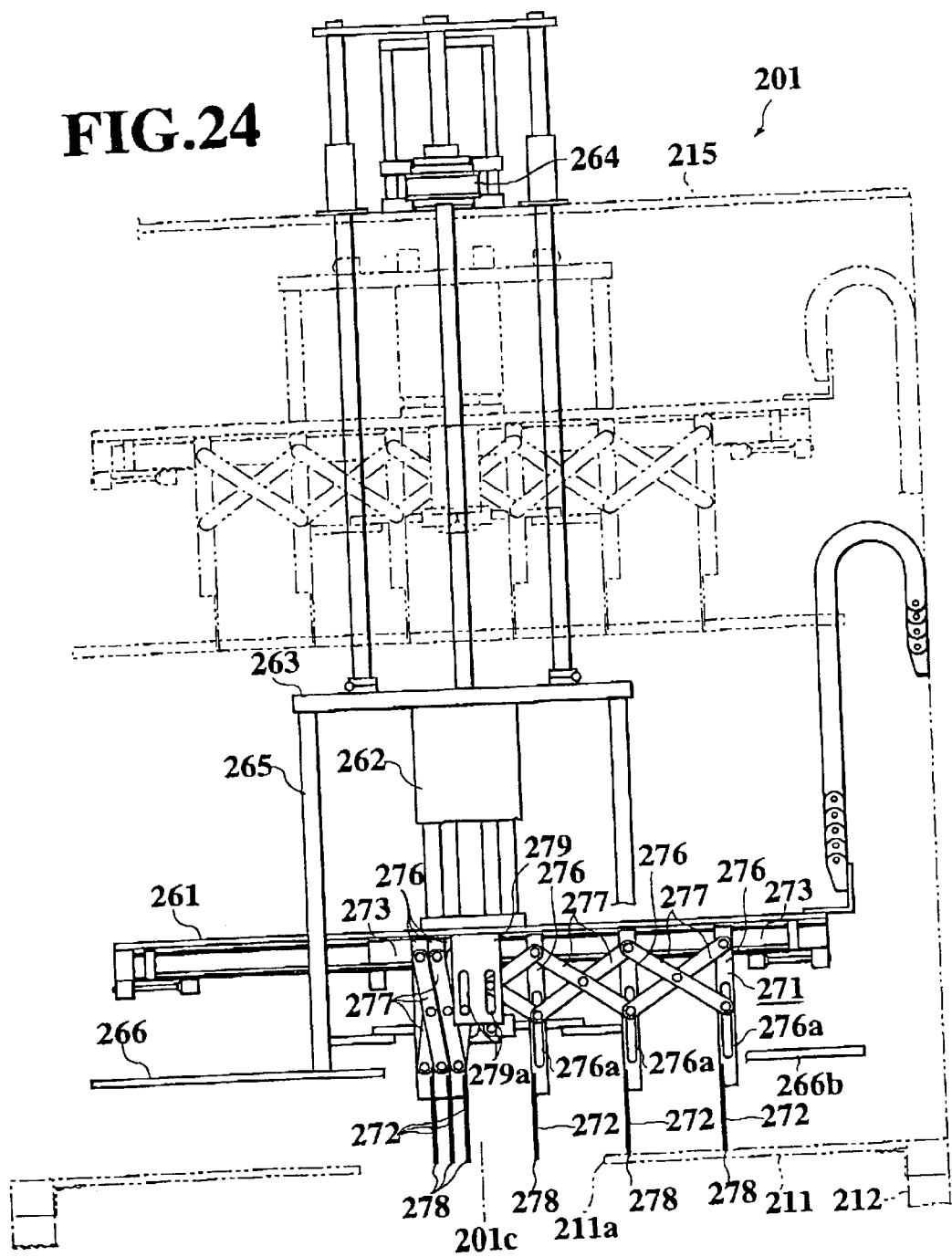
Figure 25A:
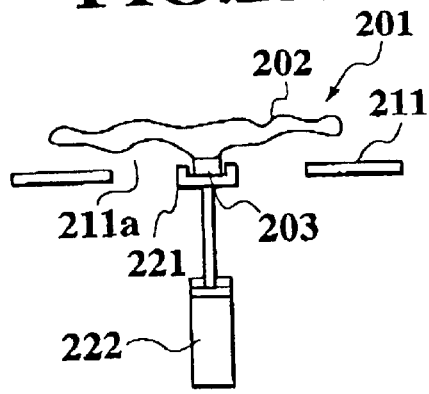
Figure 25B:
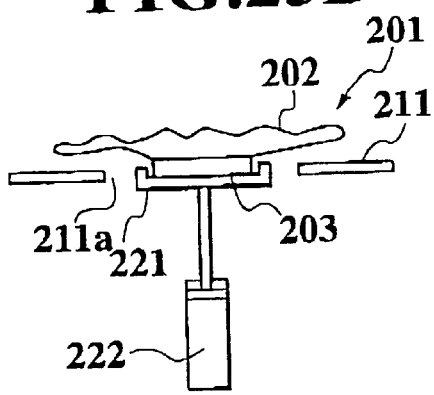
Figure 25C:
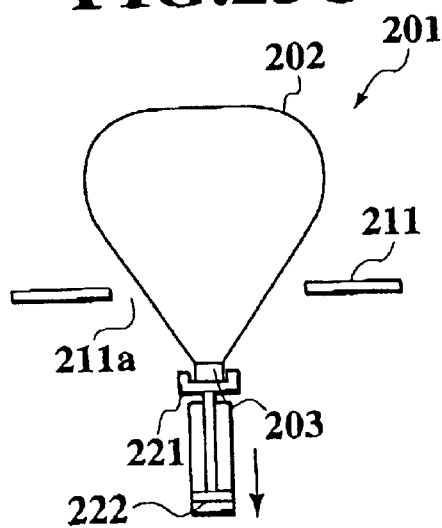
Figure 25D:
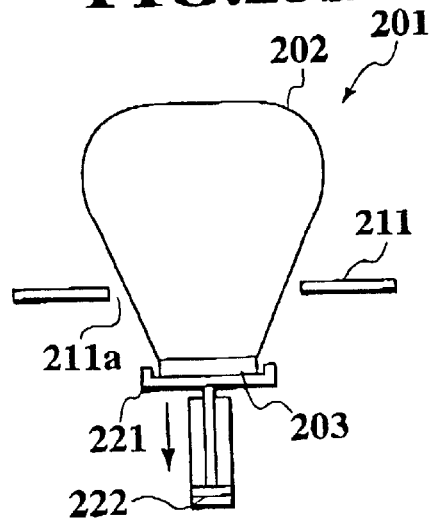
Figure 25E:
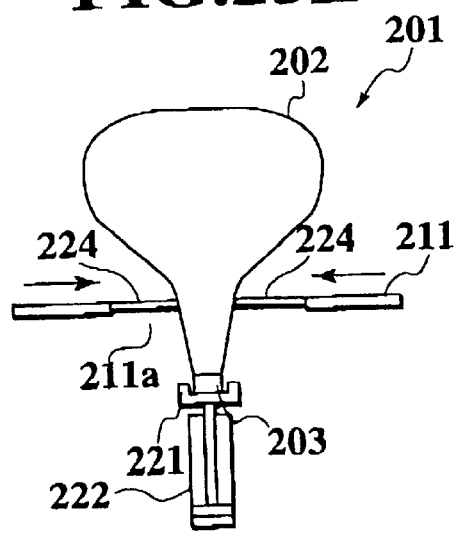
Figure 25F:
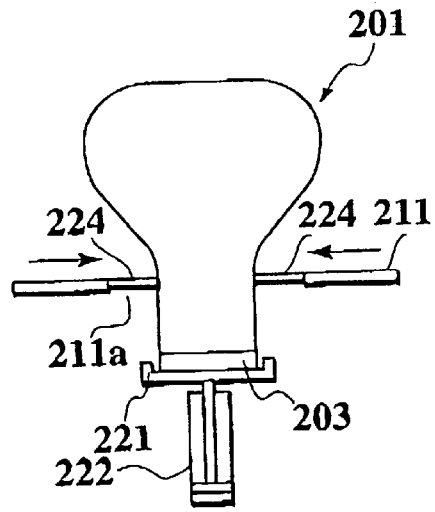
Figure 26A:
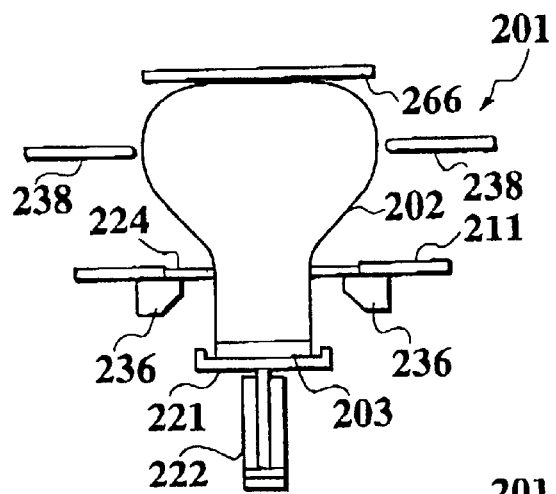
Figure 26B:
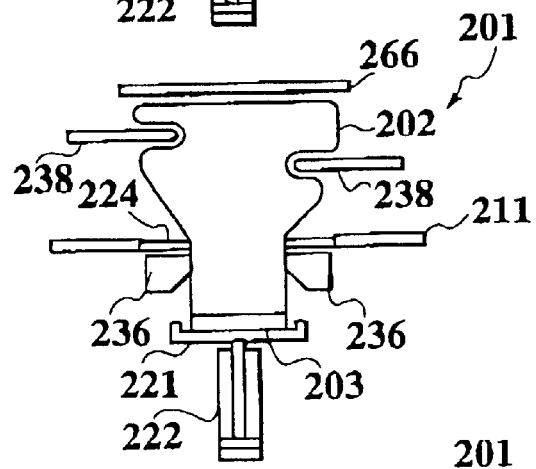
Figure 26C:
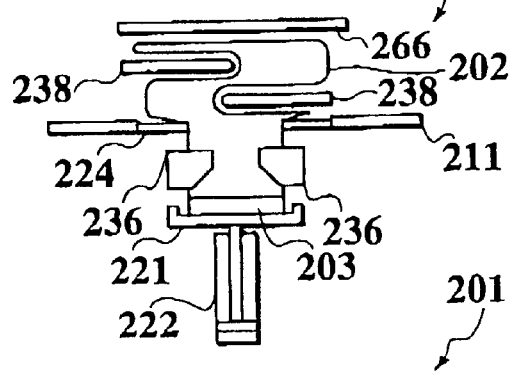
Figure 26D:
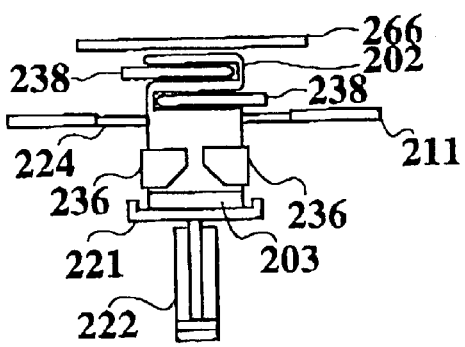
Figure 27:
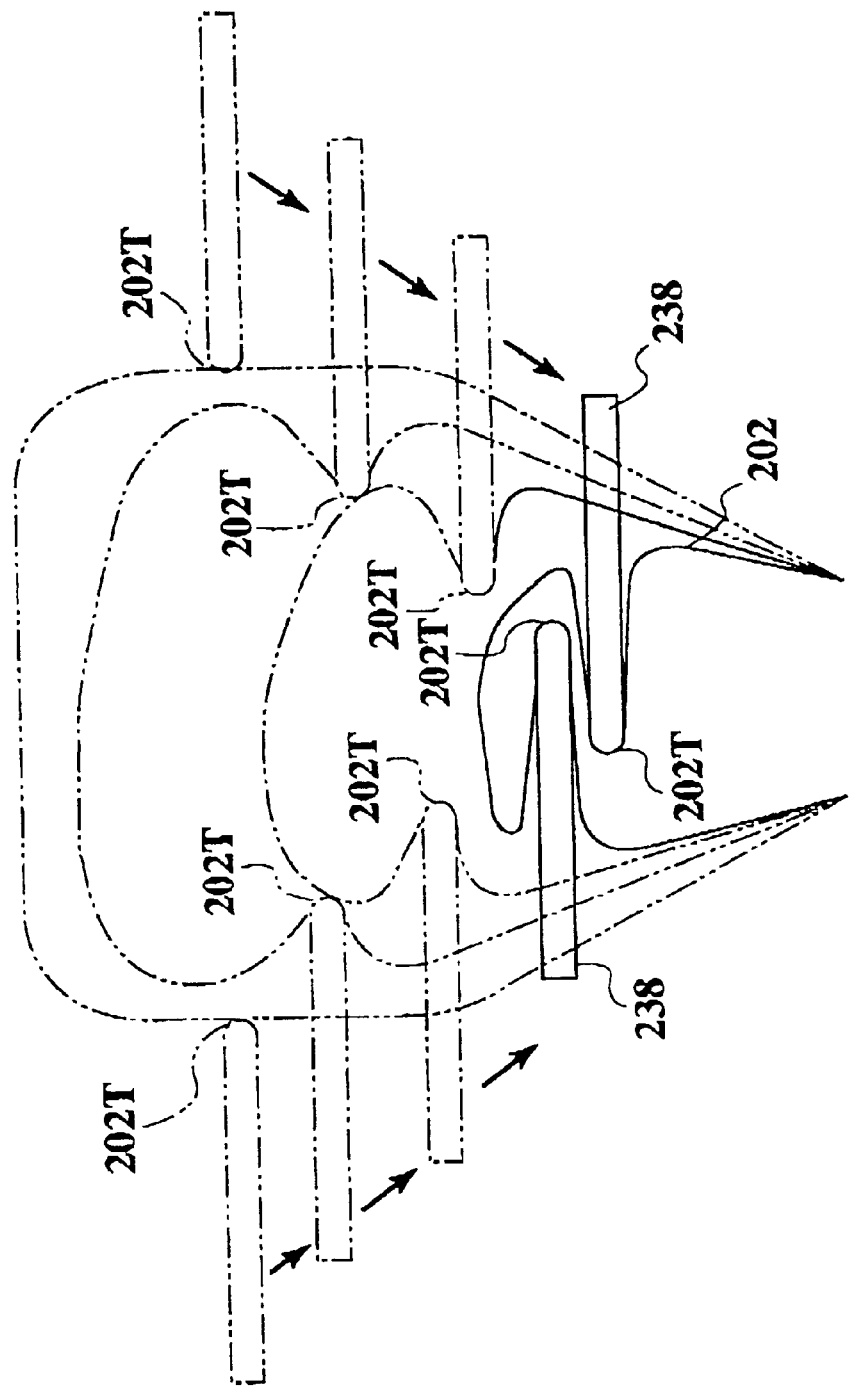
Figure 28A:
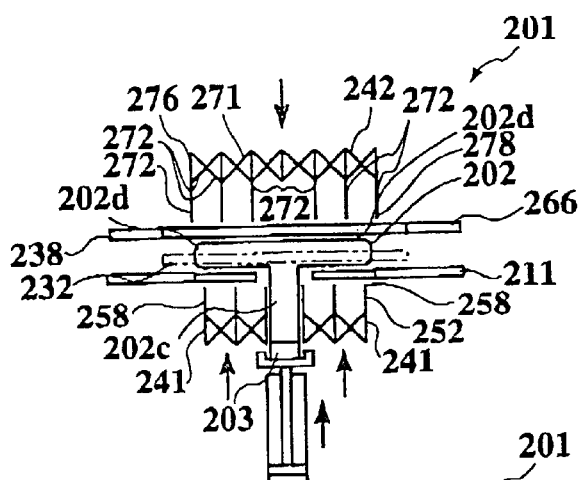
Figure 28B:
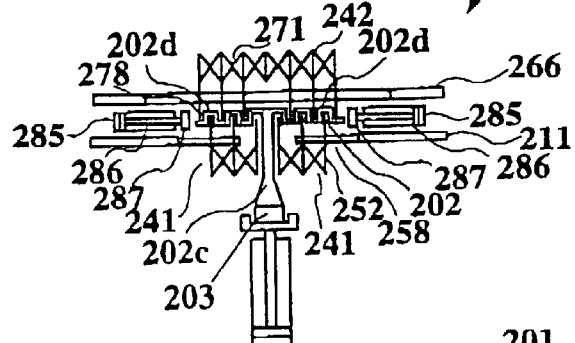
Figure 28C:
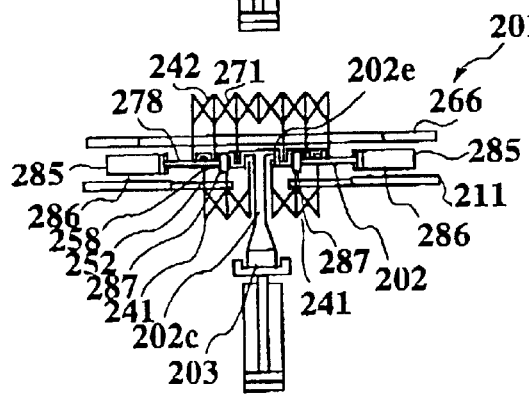
Figure 28D:
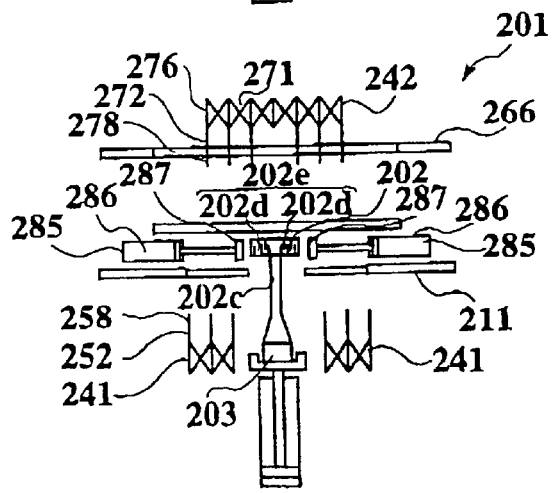
Figure 29:
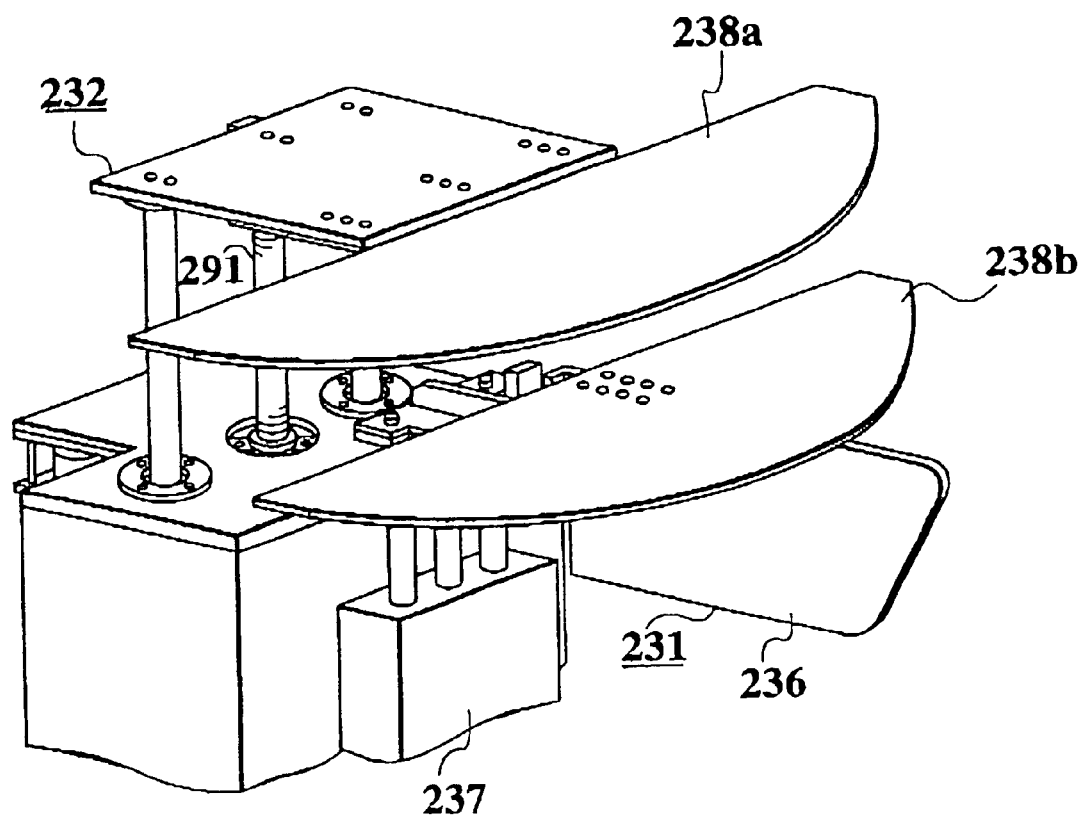
Figure 30A:
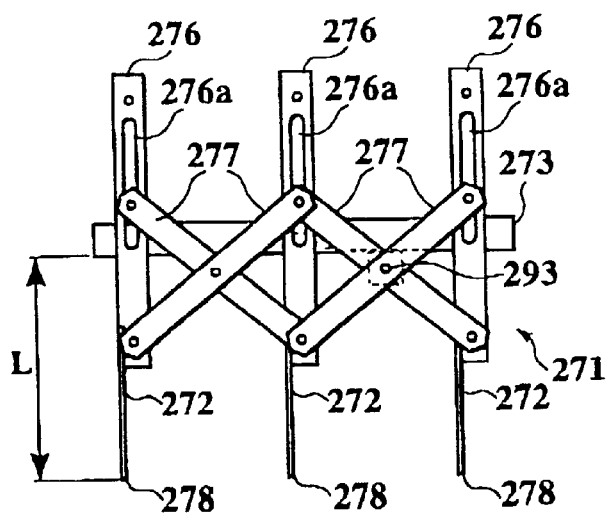
Figure 30B:
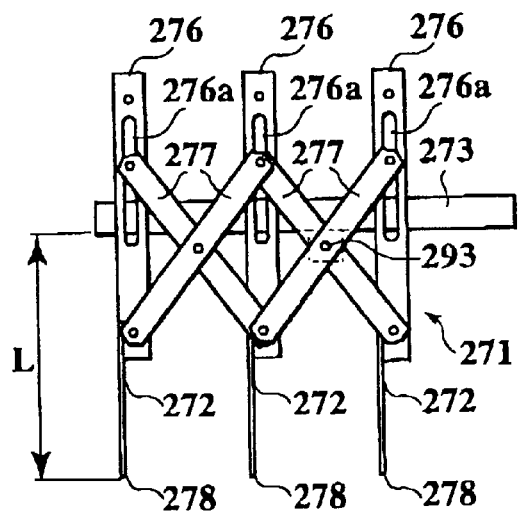
Figure 30C:
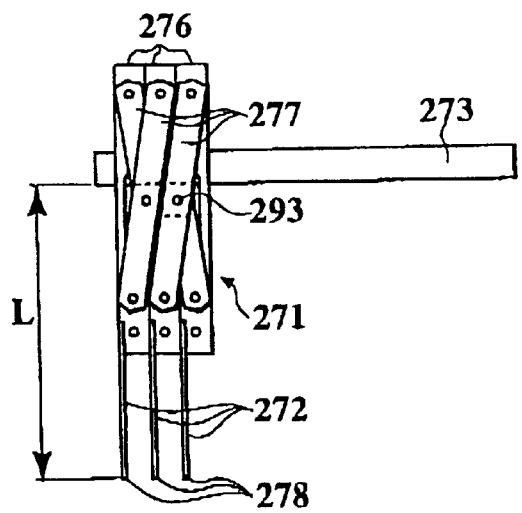

FIG, 13C is a sectional view showing a subsequent procedure to that shown in FIG. 13B;

FIG. 14A is an explanatory view showing a folding procedure according to another embodiment;

FIG. 14B is a sectional view of a portion of the folding procedure shown in FIG. 14A;

FIG. 14C is a sectional view showing a subsequent procedure to that shown in FIG. 14B;

FIG. 15 is an explanatory view showing a folding procedure according to another embodiment;

FIG. 16A is an explanatory view showing a folding procedure according to another embodiment;

FIG. 16B is a sectional view showing a subsequent procedure to that,shown in FIG. 16A;

FIG. 17 is an explanatory view showing a folding procedure according to another embodiment;

FIG. 18 is an explanatory view showing a developing operation of the airbag shown in FIG. 17;

FIG. 19 is a schematic perspective view of a folding apparatus of an airbag according to a second embodiment of the invention;

FIG. 20A is a plan view of the airbag showing an operation procedure of the folding apparatus shown in FIG. 19;

FIG. 20B is a side view of FIG. 20A;

FIG. 20C is a plan view showing a subsequent procedure to that shown in FIG. 20A;

FIG. 20D is a side view of FIG. 20C;

FIG. 20E is a plan view showing a subsequent procedure to that shown in FIG. 20C;

FIG. 20F is a side view of FIG. 20E;

FIG. 20G is a sectional view showing a subsequent procedure that shown in FIG. 20F;

FIG. 20H is a sectional view showing a subsequent procedure that shown in FIG. 20G;

FIG. 21 is an explanatory sectional view taken along the line XXI—IXXI in FIG. 19;

FIG. 22 is an explanatory sectional view taken along the line XXII—XXII in FIG. 19;

FIG. 23 is a plan view of a first corrugating unit;

FIG. 24 is a plan view of a second corrugating unit;

FIG. 25A is a side view showing a bag set procedure;

FIG. 25B is a front view of FIG. 25A;

FIG. 25C is a side view showing a subsequent procedure to hat shown in FIG. 25A;

FIG. 25D is a front view of FIG. 25C;

FIG. 25E is a side view showing a subsequent procedure to that shown in FIG. 25C;

FIG. 25F is a front view of FIG. 25E;

FIG. 26A is a front view showing a vertically folding procedure;

FIG. 26B is a front view showing a subsequent procedure to that shown in FIG. 26A;

FIG. 26C is a front view showing a subsequent procedure to that shown in FIG. 26B;

FIG. 26D is a front view showing a subsequent procedure to that shown in FIG. 26C;

FIG. 27 is an explanatory view showing the vertically folding procedure;

FIG. 28A is a side view showing a vertically folding procedure;

FIG. 28B is a side view showing a subsequent procedure to that shown in FIG. 28A;

FIG. 28C is a side view showing a subsequent procedure to that shown in FIG. 28B;

FIG. 28D is a side view showing a subsequent procedure to that shown in FIG. 28C;

FIG. 29 is a perspective view showing another embodiment second developing portion folding means;

FIG. 30A is a side view showing an initial state of another embodiment of a second corrugating unit;

FIG. 30B is a side view showing an intermediate state of the second corrugating unit shown in FIG. 30A; and FIG. 30C is a side view showing a fully-closed state of the second corrugating unit shown in FIG. 30A.

DESCRIPTION OF THE PREFERRED EMBODIMENTS

Embodiments of the present invention will be explained below with reference to the accompanying drawings.

First Embodiment

Figure 2:
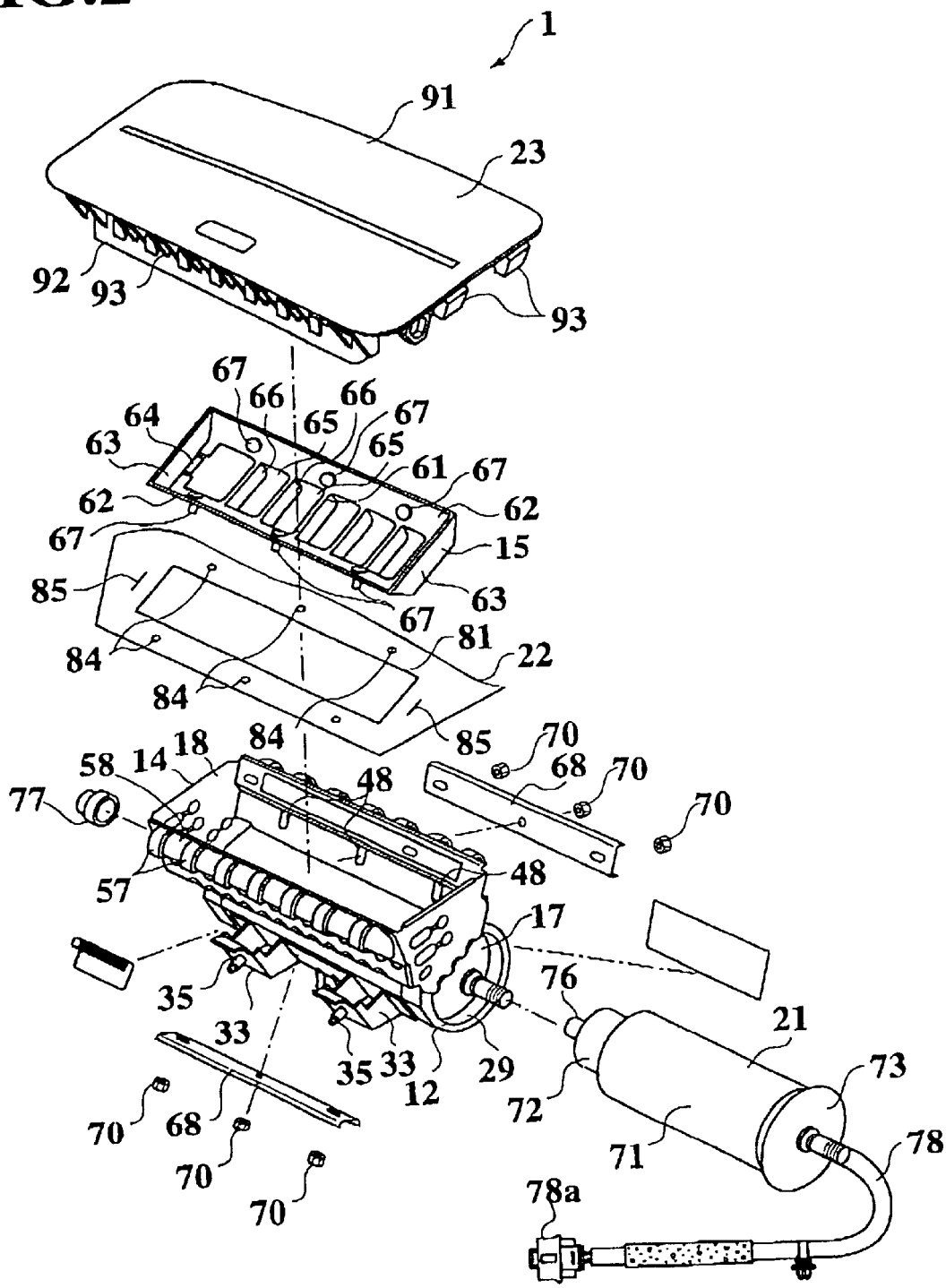
FIG. 2 is an exploded perspective view showing an airbag apparatus of the first embodiment.
Figure 3:
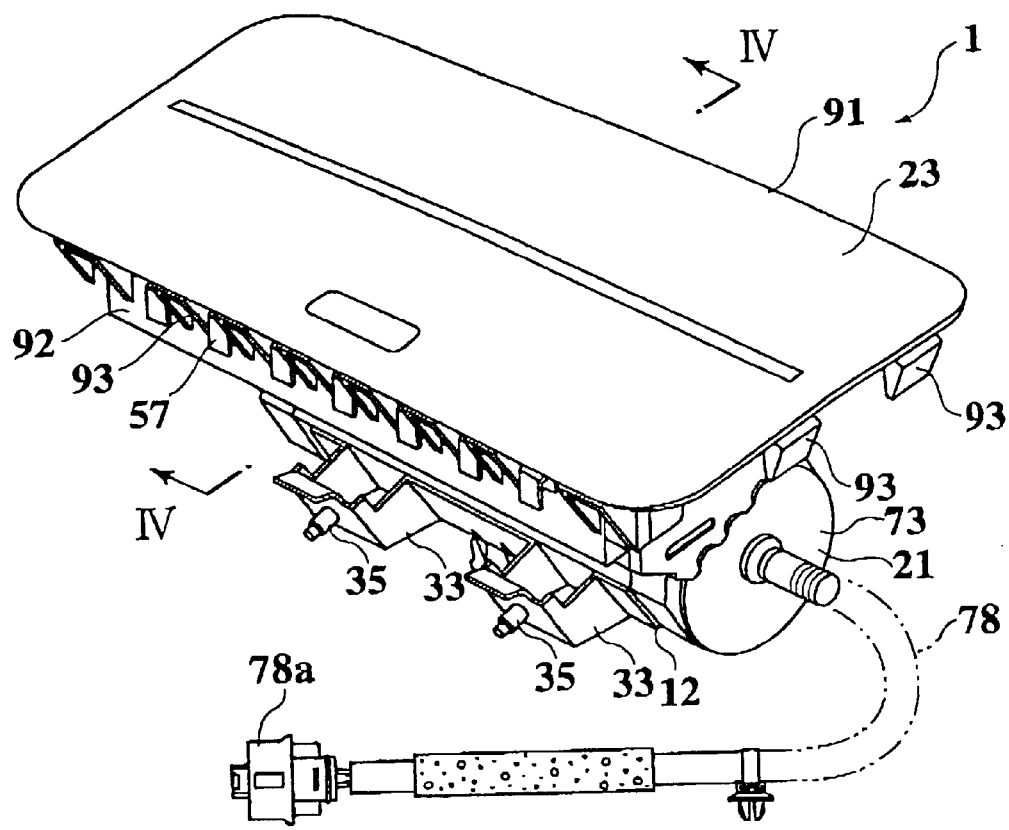
FIG. 3 is a perspective view showing the airbag apparatus of the first embodiment.
Figure 4:
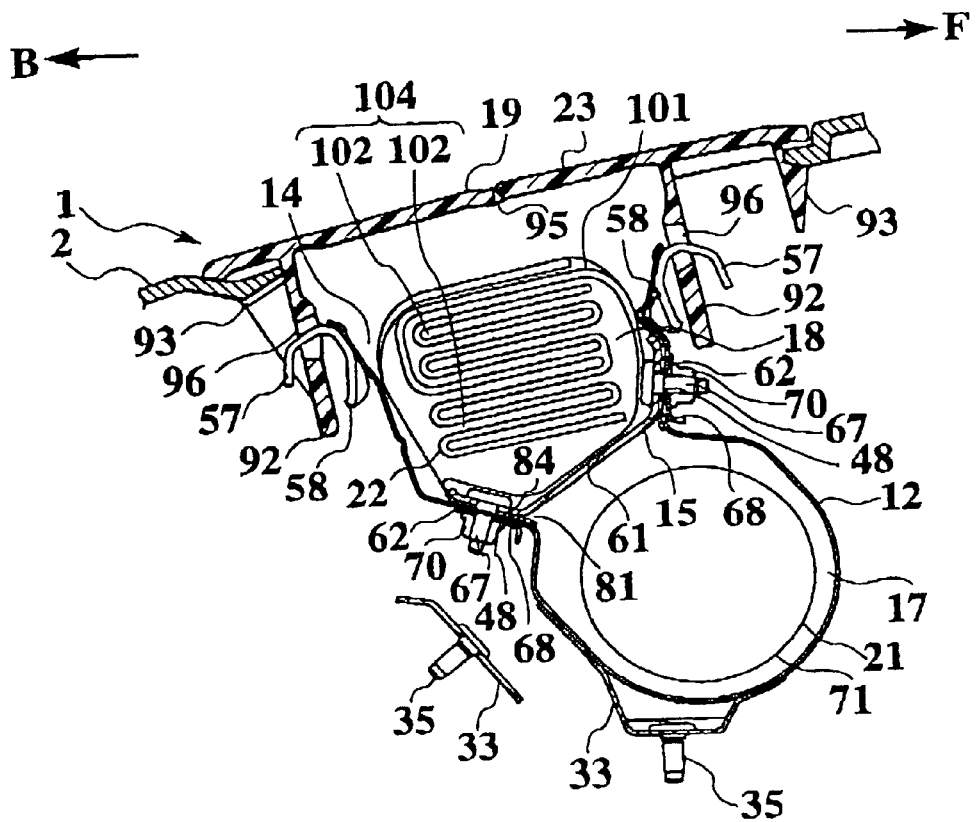
FIG. 4 is a sectional view taken along the line IV—IV in FIG. 3.
Figure 8:
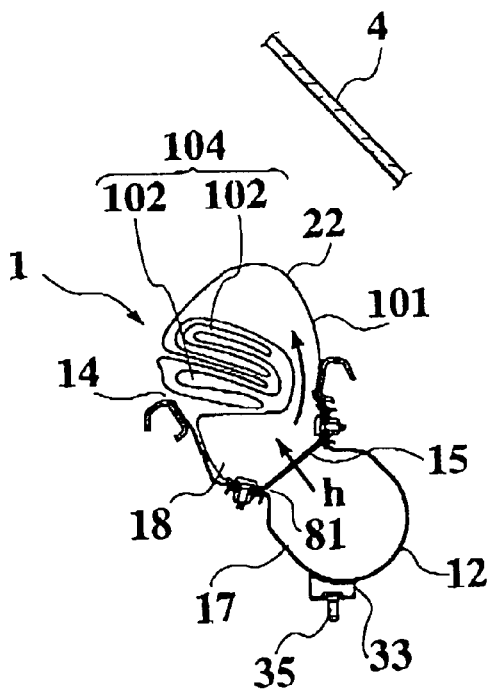
FIG. 8 is a sectional view showing a developing operation of the airbag shown in FIG. 7.

As shown in FIGS. 2 to 4, an airbag apparatus 1 is disposed inside of an instrument panel 2 as an installation portion located forward of a passenger's seat of an automobile (passenger's seat as an installation object), and constitutes a passenger-side airbag. In the following description, forward (direction of arrow F shown in FIG. 4), rearward (direction of arrow B shown in FIG. 4), and a vertical direction correspond to forward, rearward; and vertical direction of the automobile in a state in which the airbag apparatus 1 is mounted to the automobile. The instrument panel 2 is formed into a curved surface slightly curved downward rearward (toward the passenger's seat). The airbag apparatus 1 is secured to a reinforce as an installation mounting member disposed inside of the instrument panel 2 by a screw or the like. As shown in FIG. 8, a front glass 4 inclining from forward and lower direction toward upper and rearward direction is disposed on an upper side of the instrument panel 2.

The airbag apparatus 1 includes a retainer 12 as a case body. The retainer 12 is formed into substantially a box-like shape having a projection port 14 opened upward. The inside of the retainer 12 is defined into a lower inflator accommodation portion 17 and an upper airbag accommodation portion 18 by means of a mid retainer 15 which is a partitioning member. An inflator 21 for injecting gas is accommodated in the inflator accommodation portion 17. A bag-like airbag 22 is folded and accommodated in the airbag accommodation portion 18. The projection port 14 is covered with a cover body (lid) 23 which is capable of being ruptured.

The retainer 12 is formed by bending or welding a metal plate. The projection port 14 is disposed such that it directs upward and slightly rearward along the instrument panel 2. The inflator accommodation portion 17 is formed into a substantially cylindrical shape whose opposite directions correspond to an axial direction of the cylindrical shape. An inflator mounting hole 29 is formed in each of opposite ends of the inflator accommodation portion 17. A bracket portion 33 is secured to the retainer 12 by welding or the like at a lower end side and a front side of the inflator accommodation portion 17. A bolt 35 secured to the bracket portion 33 is secured to the reinforce by a nut and with this, the retainer 12, i.e., the airbag apparatus 1 is secured to a vehicle body. The airbag accommodation portion 18 is formed at Its front and rear surfaces at its lower end side with a circular or elongated hole-like mounting hole 48. A cover mounting body 58 which is integrally formed with a plurality of cover mounting pawls 57 having substantially C-shaped cross. section is secured to front and rear outer surfaces of the upper end side of the airbag accommodation portion 18.

The mid retainer 15 is formed by bending a metal plate for example. The mid retainer 15 includes a base plate 61, mounting portions 62 formed by inclining and bending front and rear sides of the base plate 61 upward, and end plates 63 formed by bending opposite ends of the base plate 61 upward. The base plate 61 is formed at its opposite ends with locking pieces 64. The base plate 61 is formed with a plurality of gas passing ports 65. Each of the gas passing ports 65 is provided with a blade inclining in a predetermined direction. Three stud bolts 67 integrally project from each of the front and rear mounting plates 62 such as to incline downward. A nut 70 is threadedly engaged with each of the bolts 67 through reinforcing plates 68.

The inflator 21 includes a Bomb like body 71. The body 71 is provided at its one end with a gas discharge portion 72 and at the other end with a fixing-receiving portion 73. The body 71 is formed into a so-called hybrid inflator. The inflator of a type which is with a gas generating chamber in which an igniter a propellant and the like are accommodated, or the other type of the inflator, so called hybrid inflator, having a gas strage chamber in which compressed gas is charged and is disposed in through a partitioning wall capable of being ruptured is provided therein. The gas discharge portion 72 is formed at its peripheral surface with a plurality of gas injection holes. A bolt 76 projects from the gas discharge portion 72. The bolt 76 passes through an inflator mounting hole (not shown) provided in one end of the retainer 12 and engages a nut 77. A connector 78a is connected to a lead wire 78, and the latter pulled out from an end surface of the fixing-receiving portion 73. A label is affixed to an outer surface of the body 71.

The airbag 22 is formed into a bag-like shape by sewing, e.g., two pieces of the base cloth together such that its width and thickness are increased from the side where a rectangular opening is provided toward the opposite side of the airbag substantially cylindrical surface. Circular mounting holes 84 are formed in front and rear sides of the opening 81 at predetermined distances from one another. Slit-like mounting holes 85 are formed in opposite short piece portions of the opening 81. The airbag 22 is formed with an exhaust port 88 at a position thereof slightly separated from the opening 81.

The cover body (airbag cover) 23 includes a substantially flat-plate like upper plate 91 which is substantially flush with the instrument panel 2, front and rear leg pieces 92 projecting from a lower surface of the upper plate 91 downward, and pawls 93 disposed outer sides of the leg pieces 92. The cover body 23 is integrally injection molded using synthetic resin such as thermoplastic elastomer. The upper plate 91 is formed at its lower surface with a rupture portion (tear seam) 95 which is thinner than other portion and easily ruptured. The rupture portion 95 is formed into substantially H-shape as viewed on a plan. Each of the leg pieces 92 is formed with locking holes 96 at a predetermined distance in lateral direction.

When the airbag apparatus 1 is assembled, the airbag 22 is first mounted to the mid retainer 15, the mid retainer 5 is mounted such as to cover the gas discharge port inside the retainer 12, the airbag 22 is folded and accommodated in the airbag accommodation portion 18, the projection port 14 is covered with the cover body 23, and the inflator 21 is mounted to the inflator accommodation portion 17.

That is, the stud bolts 67 of the mid retainer 15 are inserted from inside of the circular mounting holes 84 of the airbag 22, and the locking pieces 64 are inserted in the slit-like mounting holes 85 and in this state, the mid retainer 15 is inserted in the retainer 12. Then, the front and rear side stud bolts 67 are inserted in the mounting holes 48 of the retainer 12, and the nuts 70 are threadedly engaged with the bolts 67 from outside through the reinforcing plates 68 and fastened. In this state, the periphery of the opening 81 of the airbag is sandwiched and fixed between the mid retainer 15 and the retainer 12, and the opening 81 of the airbag 22 covers the gas discharging port 65. The airbag 22 is folded into a predetermined small shape as described latter in any one of front and rear position where the mid retainer 15 is mounted to the retainer 12. and the airbag 22 is accommodated in the airbag accommodation portion 18. Then, the projection port 14 is covered with the cover body 23, and the cover mounting pawl 57 of the retainer 12 is locked to the locking hole 96 of the leg piece 92. With this, the cover body 23 is fixed in a state in which the cover body 23 covers the upper side of the airbag 22. The inflator 21 is inserted from one of the inflator mounting holes 29 of the inflator accommodation portion 17 of the retainer 12, and the bolt 76 is projected from the other inflator mounting hole. The nut 77 is threadedly engaged with the projected bolt 76 and fastened, thereby air-tightly closing the opposite inflator mounting holes 29.

The airbag apparatus 1 structured as described above is secured to the vehicle body by fastening and fixing the bolt 35 of the bracket 33 to the supporting plate provided on the reinforce by means of a nut. In this state, the pawl 93 of the cover body 23 engages a back surface of the instrument panel 2.

In the airbag apparatus 1 structured as described above, at the time of collision of the automobile, a controller (not shown) detects the impact (abrupt deceleration exceeding a predetermined value) to operate the inflator 21, and an inert gas such as nitrogen gas is injected from the inflator 21. The gas passes through the gas discharging port 65 of the mid retainer 15 while being rectified by the blades 66, and flows inside the airbag 22 to expand and develop the airbag 22. The airbag 22 pushes the cover body 23 from inside to rupture the upper plate 91 of the cover body 23 along the rupture portion 95, and forms a projection port of the airbag 22. Subsequently, the airbag 22 projects from the projection port to expand and develop along the front glass 4 as will be described later so as to moderate the impact to be applied to the passenger. When a small impact which does not satisfy the condition for operating the inflator 21 is applied, or when a multiple pile-up collision is caused, if the automobile receives further impact after the airbag 22 once expands and develops, the retainer 12 of the airbag apparatus 1 and the like deform to moderate the impact to be applied to the passenger.

Next, the folding procedure of the airbag 22 will be explained with reference to FIGS. 1 and 5 to 7.

Figure 1A:
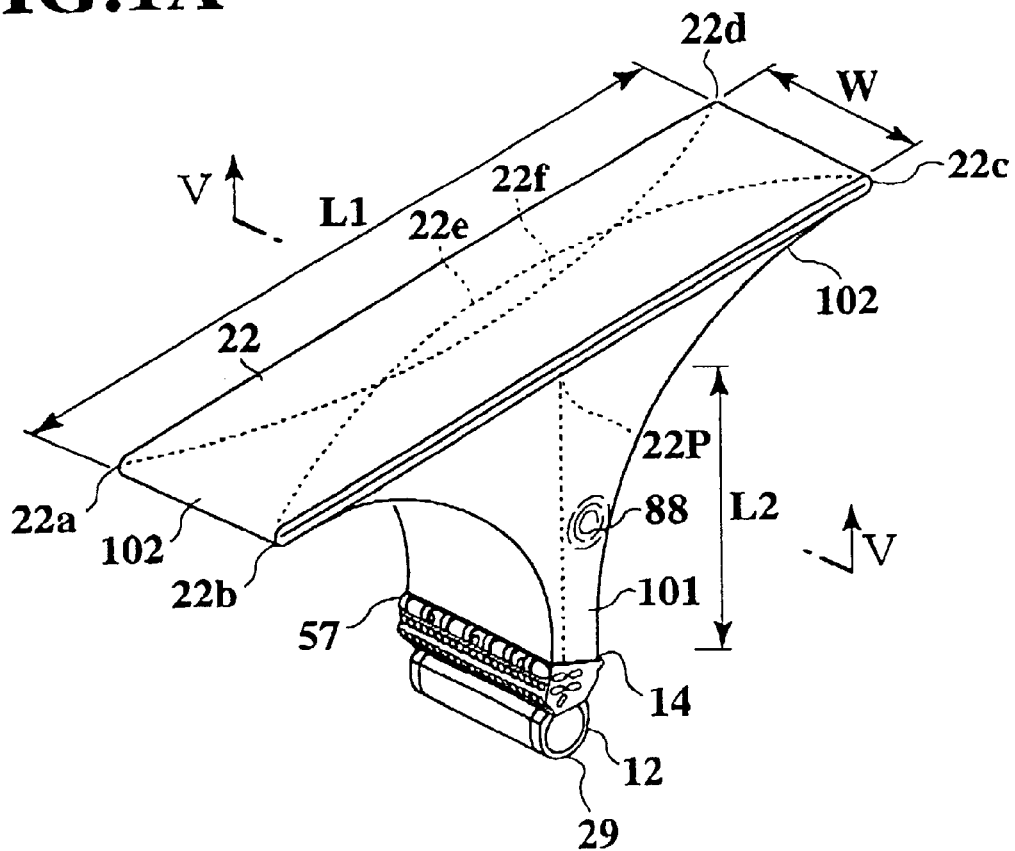
FIG. 1A is an explanatory view showing a folding procedure according to a first embodiment of the present invention.
Figure 5:
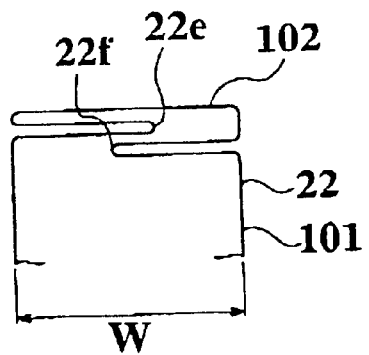
FIG. 5 is a sectional view taken along the line V—V in FIG. 1A.

As shown in FIGS. 1A and 5, in a state in which the airbag 22 mounted in the retainer 12 is pulled out upward, four corners 22a, 22b, 22c and 22d at portions each having the fore-and-aft maximum size are held, and widthwise excessive opposite portions 22e and 22f are pushed inside the airbag 22. In this state, the airbag 22 assumes a substantially rectangular shape as viewed on a plan having a fore-and-aft longitudinal size L1 and width size w, and assumes a substantially T-shape as viewed from the side having an initially projection size L2. In this state. a cylindrical portion of the airbag 22 rising from the projection port 14 of the retainer 12 becomes a first developing portion 101. and tip ends of the first developing portion 101, i.e., portions of the airbag 22 extending in the lateral direction from a prescribed point 22P which is a central portion at the side of the passenger of the airbag 22 become second developing portions 102. The width size w is set slightly smaller than a width size of the projection port 14 of the retainer 12. If the longitudinal size L1 and the width size w are set, the initial projection size L2 is automatically determined. The prescribed point 22P corresponds to the central portion at the side of the passenger of the airbag 22, i.e., to the maximum projection portion.

Figure 1B:
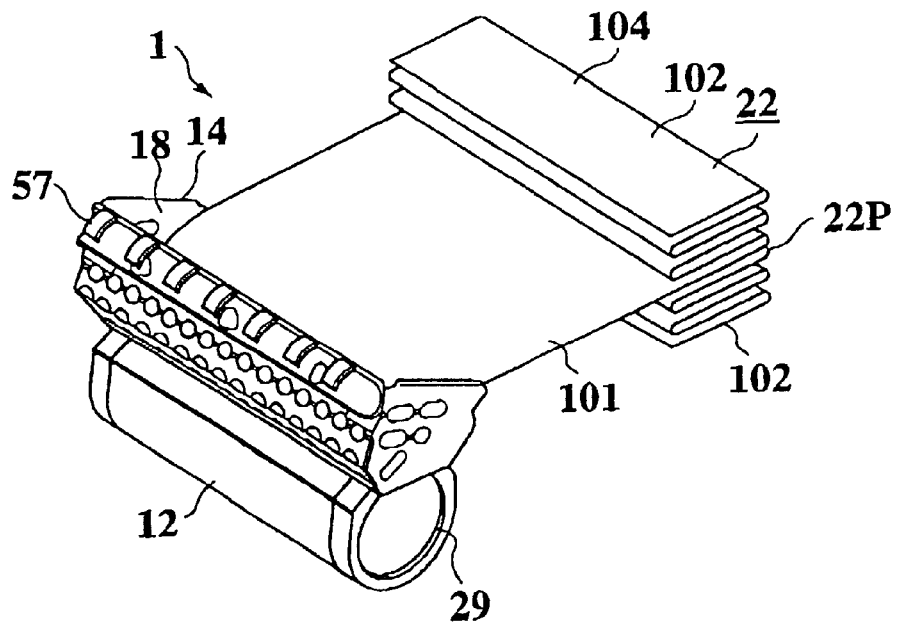
FIG. 1B is a perspective view showing a subsequent procedure to that shown in FIG. 1A.

Next, as shown in FIG. 1B, the opposite second developing portions 102 are folded into a bellows shape and gathered substantially around the prescribed point 22P to form an aggregate 104.

Figure 6:
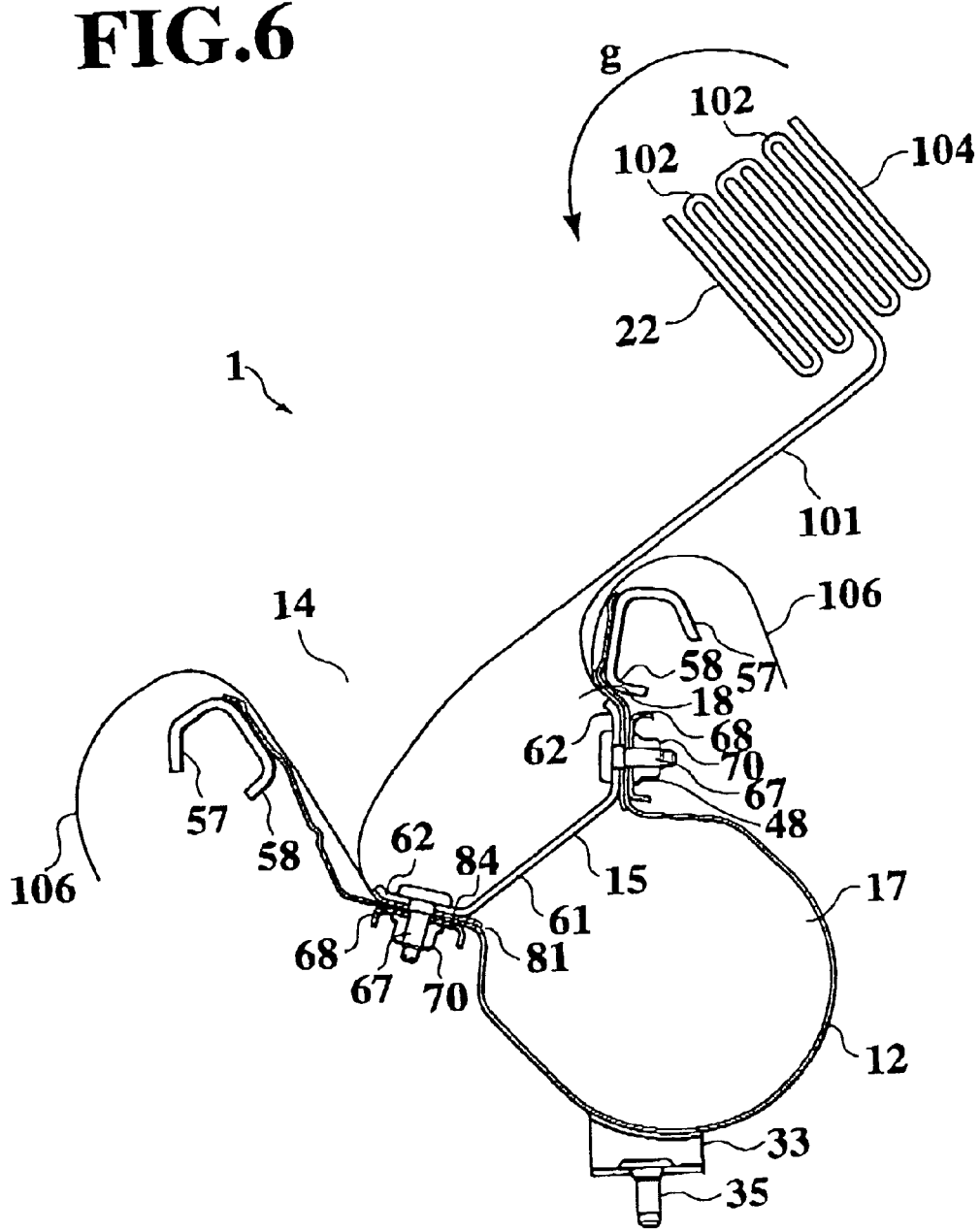
FIG. 6 is a sectional view showing a subsequent folding procedure to that shown in FIG. B.

Thereafter, the aggregate 104 is pulled out forward, and as shown in FIG. 6, the aggregate 104 is rotated rearward, and leftward (direction of arrow g) as viewed from the right side of the vehicle body to wind the first developing portion 101 around the aggregate 104.

Figure 7:
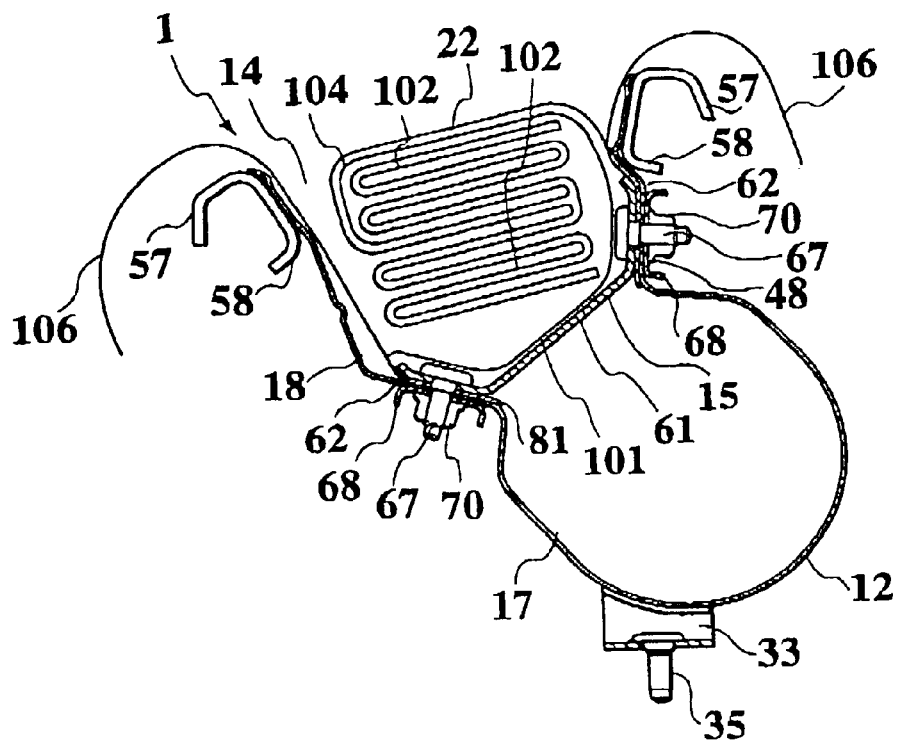
FIG. 7 is a sectional view showing a subsequent folding procedure to that shown in FIG. 5.

In the present embodiment, the aggregate 104 is rotated through about 360°. As a result, as shown in FIG. 7, the airbag 22 is accommodated in the airbag accommodation portion 18 of the retainer 12. Further, a cover cloth 106 which is previously sewed in the vicinity of the opening 81 of the airbag 22 covers the folded airbag 22 to complete the folding procedure.

Next, a developing procedure of the airbag 22 will be explained with reference to FIGS. 8 to 12. in FIGS. 8 to 12, only the front glass 4, the retainer 12 and the airbag 22 are shown.

First, as shown in FIG. 8, gas is charged into the first developing portion 101 from the opening 81 immediately after the airbag apparatus 1 is operated to inject the gas (within 1 [msec] to 10 [msec] after the operation), the cover body 23 is ruptured while the first developing portion 101 enveloping the aggregate 104 is rewound, and the first developing portion 101 projects from the projection port 14. Then, the gas is introduced into the aggregate 104, and the second developing portions 102 start developing.

Figure 9:
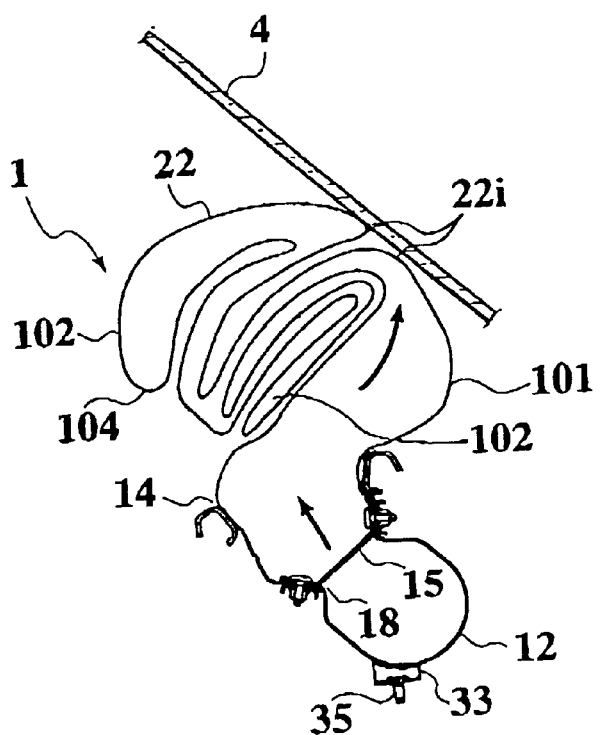
FIG. 9 is a sectional view showing a subsequent developing operation to that shown in FIG. 8.

Next, as shown in FIG. 9, gas is charged into the first developing portion 101 and each of the second developing portions 102, and the developing operations of these developing portions 101 and 102 proceed concurrently. The aggregate 104 is thrown forward by the rewinding force of the first developing portion 101, and is slidably contact with the glass at a portion 221.

Figure 10:
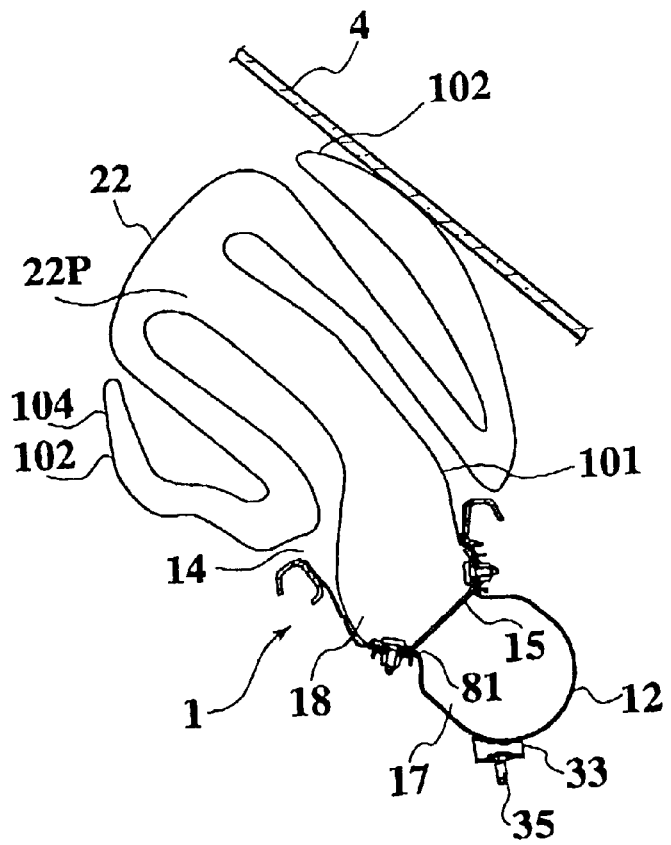
FIG. 10 is a sectional view showing a subsequent developing operation to that shown in FIG. 9.

Next, as shown in FIG. 10, (within 12 [msec] to 20 [msec] after the operation), the first developing portion 101 is rewound substantially completely, and the aggregate 104 returns to the initial state.

Figure 11:
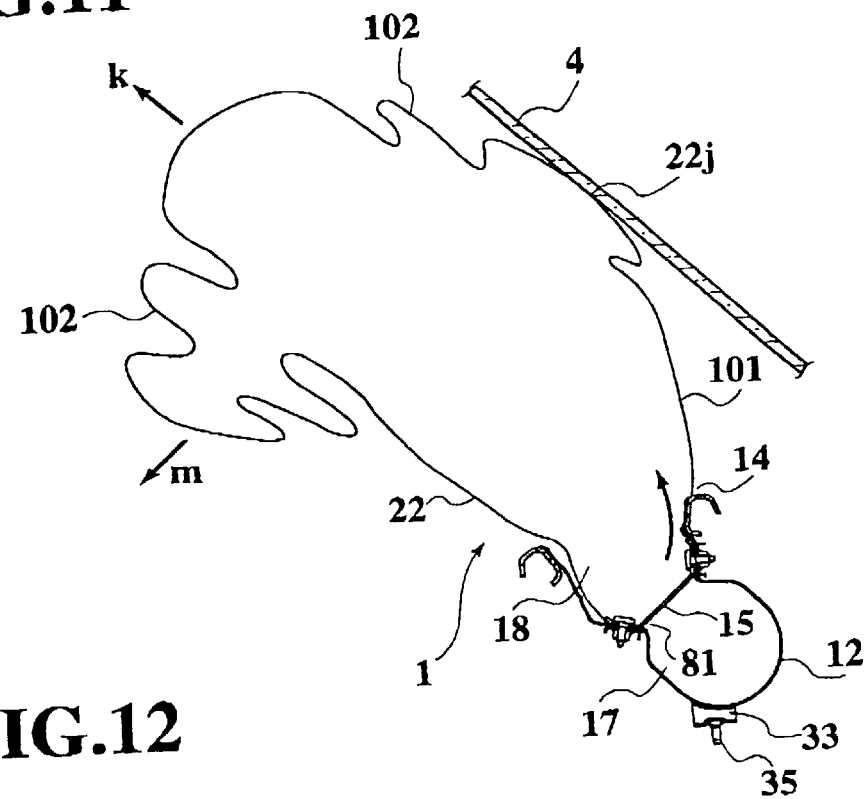
FIG. 11 is a sectional view showing a subsequent developing operation to that shown in FIG. 10.

Then, as shown in FIG. 11, (within 20 [msec] to 30 [msec] after the operation), the airbag 22 develops in a direction (direction of arrow m) in which mainly a rear portion of the second developing portion 102 and a portion thereof in the direction (direction of arrow k) along the front glass return, while the airbag 22 slides onto the front glass.

Figure 12:
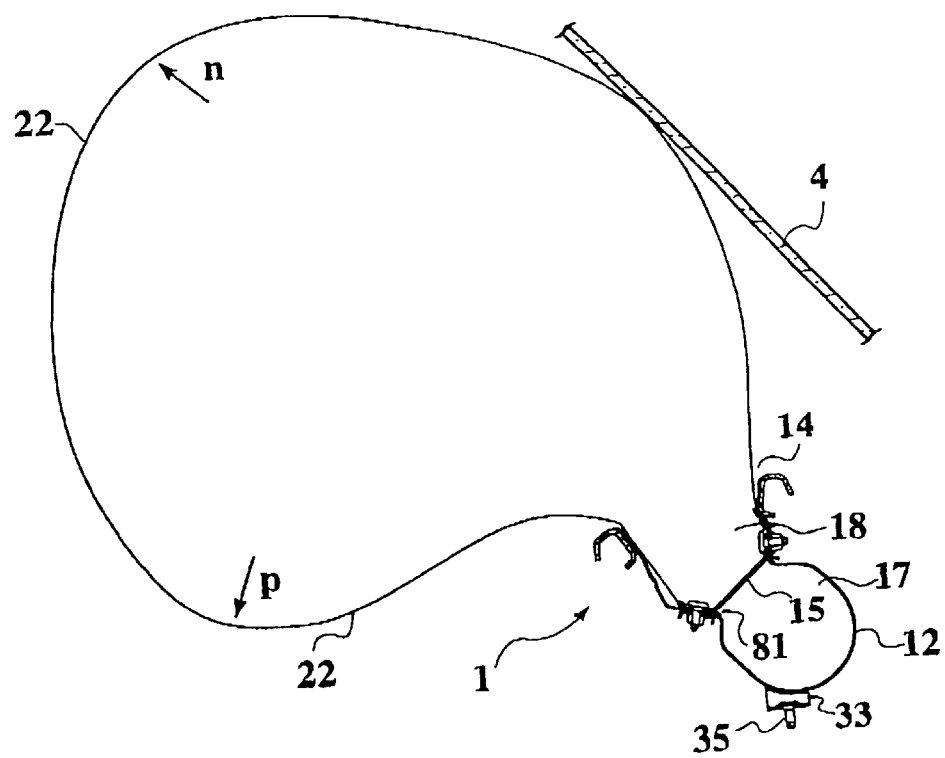
FIG. 12 is a sectional view showing a subsequent developing operation to that shown in FIG. 11.

Next, as shown in FIG. 12, (within 30 [msec] to 50 [msec] after the operation), the airbag 22 develops in a direction (direction of arrow p) in which mainly a rear portion of the second developing portion 102 and a portion thereof in the direction (direction of arrow n) along the front glass 4 return, and the airbag 22 assumes the finally developed shape.

As described above, according to the present embodiment, the airbag 22 is folded inward such that the airbag 22 assumes the width size w which is narrower than the width of the airbag accommodation portion 18, the first developing portion 101 which becomes a introducing portion of the gas and the second developing portions 102 which become holding portions of the passenger continuous from the first developing portion 101 are folded into a substantially T-shape, the second developing portions 102 folded into a bellows from its opposite ends, the aggregate 104 is formed in the connection point between the first developing portion 101 and the second developing portion 102, and the first developing portion 101 is wound around the aggregate 104. With this arrangement, when the gas is introduced, the airbag 22 smoothly develops into the entire peripheral direction around the prescribed point 22P. Therefore, it is possible to restrain the speed at which the airbag 22 partially projects while keeping a smooth and swift development of the airbag 22, and it is possible to reduce the maximum speed at which the airbag 22 expands toward the passenger at the initial stage of the development, and to reduce the surface pressure for example, and it is possible to reduce the pressure applied from the airbag 22 itself even with respect to a passenger other than one sitting on the passenger's seat wearing a sheet belt.

Since the first developing portion 101 is disposed in agreement with the flowing passage of the gas, it is possible to easily control the developing direction.

Since the aggregate 104 is wound by rotating the same on the first developing portion 101 from forward to rearward of the vehicle, it is possible to allow the airbag 22 to develop toward the other side of the passenger, i.e., toward the front glass 4.

The folding operation of the airbag 22 is simple, that is, the airbag 22 is folded into the substantially T-shape having the width size w which slightly narrower than the width size of the projection port 14 of the retainer 12, i.e., the airbag accommodation portion 18, and the extended portion is gathered toward the center and wound. The folding line of the airbag 22 in the folding procedure is simple. Therefore, the folding operation is easy, and the producing cost can be reduced.

It is possible to automatize the folding operation using a machine (folding apparatus) rather than the manual folding operation, and it is also possible to partially automatize the folding operation and to partially carry out the operation manually. For example, the first and second developing portions 101 and 102 are folded into the substantially T-shape and the aggregate 104 is folded into the bellows, i.e., corrugated shape by a folding apparatus, and the first developing portion 101 is wound around the aggregate 104 and accommodated in the airbag accommodation portion 18 of the retainer 12 manually, thereby balancing the cost required for developing and producing the folding apparatus and the cost required for the manual operation, and the producing cost can be reduced. When the airbag is folded by the machine, the opening 81 to which the heavy retainer 12 mounted is directed downward, the inside of the airbag 22 is once pressurized to expand and develop the airbag, and the airbag is stabilized in a predetermined position. With this operation, the folding operation is facilitated and the producing cost can be reduced. The airbag 22 can be folded without mounting the airbag to the retainer, and the airbag can also be folded in a state in which the opening 81 is directed laterally or upward and hung down.

Although the second developing portion 102 extending in two directions is folded into the bellows in the present embodiment, the second developing portion 102 may project into three or more plurality of directions, and instead of folding into the bellows, each of the second developing portion 102 may be wound or simply folded into a substantially corrugated shape such as to compress the second developing portion 102 toward the prescribed point 22P.

In the procedure for forming the first and second developing portions 101 and 102, the airbag 22 can be formed such as to have the predetermined width size by various method such as folding the airbag outward, rather than pushing the airbag from the side inward.

Figure 13C:
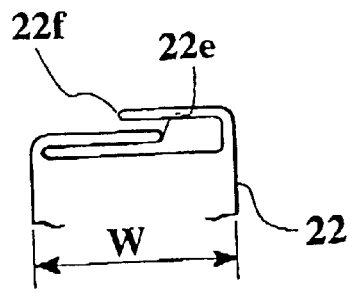

For example, as the procedure for forming the second developing portion 102, as shown in FIG. 13, the opposite portions 22e and 22f of the airbag 22 opposed to the passenger are folded outward, and the four corners 22a, 22b, 22c and 22d are pressed to apply the tension and in this state, the airbag 22 can preliminary be folded into a substantially triangle shape as viewed from the side. From this state, as shown in FIGS. 13 and 14, the first developing portion 101 is pressed in the direction of the arrow T, two pair of opposite ears 111 which have excessive base cloth are folded backward and aligned, and with this operation, each of the first and second developing portions 101 and 102 can be formed into a plate-like shape. As to the first developing portion 101, as shown in FIGS. 13 and 15, it is possible to fold the first developing portion 101 inward along a single or a plurality of folding lines U at a predetermined positions. thereby forming the same into the plate-like shape. In this manner, the folding method of the first developing portion 101 and the folding method of the second developing portions 102 can appropriately be combined to fold the developing portions into the substantially T-shape.

It is necessarily to fold the first and second developing portions 101 and 102 to a specific plate-like shape into the substantially T-shape. For example, from the preliminary folding state shown in FIG. 1A or 13, a portion of the prescribed point 22P can be dropped toward the retainer 12 to form it into a substantially Y-shape as shown in FIG. 16A and then, each of the second developing portions 102 can be folded into the bellows toward the prescribed point 22P as shown in FIG. 16B.

Further, the folding method of the first and second developing portions 101 and 102 as well as the aggregate 104, and the accommodation method into the airbag accommodation portion 18 can also be combined appropriately. That is, after the folding method of the first and second developing portions 101 and 102 as well, as the aggregate 104 are folded into the substantially T-shape by the processes shown in FIGS. 1A or 13, the second developing portions 102 may be folded into the bellows or wound or irregularly compressed to form the aggregate 104 and then, the first developing portion 101 may be wound around the aggregate 104, the first developing portion 101 may be folded into the bellows or irregularly compressed and accommodated into the airbag accommodation portion 18. Further, after the airbag 22 is folded into the substantially Y-shape as shown in FIG. 16A, the second developing portions 102 may be folded into the bellows or wound or irregulary compressed to form the aggregate 104 and then, the first developing portion 101 may be wound around the aggregate 104 or folded into the bellows, or irregularly compressed and accommodated into the airbag accommodation portion 18. Alternatively, as shown in FIG. 1A or 13, from the substantially triangle preliminary folded state as viewed from the side, the second developing portions 102 may be folded into the bellows or wound or irregularly compressed and directly accommodated into the airbag accommodation portion 18, and the aggregate may be formed in a state in which the airbag is accommodated in the airbag accommodation portion 18.

That is, by developing the airbag 22 substantially around the prescribed point 22P away from the projection port 14 by a predetermined distance in a state in which the airbag is projected from the projection port 14 by a predetermined distance, it is possible to develop the airbag smoothly.

In each of the above examples, the second developing portions 102 extending into two directions or the like may be deviated from each other, i.e., length and direction of the second developing portions 102 may be different from each other, instead of forming them into the same size. With this arrangement, a desired developed shape and developing characteristics can easily be obtained.

For example, as shown in FIGS. 17 and 18, in a general layout of a vehicle, a size Lb1 between the airbag apparatus 1, i.e., the instrument panel 2 side and the lower side, i.e., the passenger side is greater than a size La1 of the airbag apparatus 1, i.e., the instrument panel 2 side and the upper side, i.e., the front glass 4 side. For this reason, as to the size of the second developing portion 102, i.e., the size from the prescribed point 22P to a tip end of each of the second developing portions 102, if the size La2 of the front glass 4 side is set greater than the size Lb2 of the passenger side, it is possible to smoothly develop the airbag 22 such that the airbag 22 fills the space.

Although the airbag apparatus 1 to be mounted in the instrument panel 2 for the passenger's seat has been described in the above embodiment, the present invention can also be applied to various airbag apparatuses such as an airbag apparatus to be mounted to a door panel and an airbag apparatus for a rear seat to be mounted to a back surface of a front seat.

Second Embodiment

As shown in FIG. 19, a folding apparatus 201 is provided in an assist airbag, i.e., in an instrument panel forward of a passenger's seat of an automobile, and is capable of accommodating, into an accommodation portion 204 of a retainer 203 as a mounting member, an airbag 202 of an airbag apparatus for a passenger's seat for expanding and developing the airbag at the time of collision of the automobile for protecting the passenger on the passenger's seat.

As shown in FIG. 19, the airbag 202 to be folded by the folding apparatus 201 is formed into a bag-like shape expanding in a spreading manner toward the passenger as a protecting object from the rectangular opening 202a through which a gas flows in. A circular exhausting port 202b is formed at a position away from the opening 202a of the airbag 202.

The folding procedure mainly comprises a bag set step, a vertically folding step and corrugating-folding step. In the bag set step, as shown in FIGS. 2A and 2B, the airbag 202 mounted to the retainer 203 is pressurized to position the airbag 202. In the vertically folding step, as shown in FIGS. 2C, 2d, 2E and 2F, the airbag 202 is folded into a substantially T-shape having a first developing portion 202c which is continuous with the opening 202a and second developing portions 202d extending fore-and-aft directions from the tip end of the first developing portion 202c. In the corrugating-folding step, as shown in FIGS. 2E, 2F and 2G, the second developing portions 202d are folded into corrugated shape, i.e., bellows, and gathered toward the first developing portion 202c to form an aggregate 202e. Subsequent to the corrugating-folding step, as shown in FIG. 2H, an accommodating step is carried out. In the accommodating step, the aggregate 202e is rotated through 270° for example and the first developing portion 202c is wound around the periphery of the aggregate 202e, and the airbag 202 is accommodated in an accommodation portion 204 of the retainer 263. The accommodating step may be carried out manually, and an apparatus for carrying out the accommodating step may be assembled to the folding apparatus 201.

When the airbag apparatus including the folded airbag 202 is operated, a gas supplied from the inflator accommodated in the retainer 203 flows from the opening 202a of the airbag 202. At that time, the first developing portion 202c first develops toward the front glass and then, the second developing portions 202d and 202d of the aggregate 202e develop in substantially entire circumferential direction. The airbag 202 smoothly and swiftly develops, the projection speed of the airbag toward the passenger is suppressed at the time of development, and excellent developing characteristics can be obtained.

Next, details of the folding apparatus 201 will be explained with reference to the drawings. The folding apparatus 201 is substantially symmetric in shape in lateral and longitudinal direction, and operates substantially symmetrically, but the drawings show different operational state in left half and right half with respect to the center line 201C.

As shown in FIG. 19, the folding apparatus 201 includes a pedestal 212 whose upper surface is used as an operation surface (operation table) 211. The pedestal 212 is provided at its front surface with two switches SW1, SW2 and one foot switch SW3. A space 217 surrounded by a ceiling plate 215 and side plates 216 made of polyvinyl chloride is provided above the operation surface 11. A sensor 219 for stopping the operation of the apparatus when an operator puts his or her hand into the operation space 217 through an opening 218 which is provided in front of the operation space 217

The operation surface 211 is provided at its substantially central portion with a retainer opening 211a in which the retainer 203 can be inserted. As shown in FIGS. 19, 21 and 23, the retainer opening 211a is provided at its lower portion with a retainer receiving jig 221. The retainer receiving jig 221 holds the retainer 203 inserted from the above in fitting manner, and driving means 222 drives the retainer 203 for advancing and retreating in the vertical direction. A turboblower 302 which is supplying-exhausting means constituting airbag holding means is connected to the retainer receiving jig 221 through a hose 301. The airbag 202 is pressurized and developed by the turboblower 302. A pair of accommodating space restriction plates 224 which are accommodating space restriction means constituting the airbag holding means are provided along a lower surface or an upper surface of the operation surface 211. A restricting portion 224a for abutting against the airbag 202 to restrict its shape is provided in each of the accommodating space restricting plates 224. The restricting portion 224a advances and retreats along the operation surface 211 by driving means 225.

As shown in FIG. 21, the operation surface 211 is provided at its lower side with a pair of opposite slide pedestals 230. First developing portion holding means 231 and second developing portion folding means 232 are mounted to the slide pedestals 230. The slide pedestals 230 are driven for advancing and retreating from the opposite sides toward the center by driving means 234. The first developing portion holding means 231 includes a first developing portion restricting plate 236 disposed in the vertical direction. The first developing portion restricting plate 236 is driven for advancing and retreating in the vertical direction by driving means 237. A tip end of the first developing portion restricting plate 236 includes a slope which is slightly retreating from the upper end toward the lower end. The second developing portion holding means 232 includes a second developing portion restricting plate 238 disposed in the horizontal direction. The second developing portion restricting plate 238 is driven for advancing and retreating in the vertical direction by driving means 239. A tip end of the second developing portion restricting plate 238 is formed into an arc shape whose central portion project most.

As shown in FIGS. 19 to 24, aggregate folding means 240 are provided above and below the operation surface 211. The aggregate folding means 240 includes a first corrugating unit 241 located below the operation surface 211 and a second corrugating unit 242 located above the operation surface 211.

The first corrugating unit 241 includes pair of front and rear first unit bases 244. The first unit bases 244 are vertically movably supported by first unit slide pedestals 246 through driving means 245. The first unit slide pedestals 246 are supported by driving means 247 for advancing and retreating in the longitudinal direction. Ring means 251, a plurality of folding bodies (folding pieces) 252 supported by the ring means 251, and a single driving means 253 for driving the ring means 251 are mounted to each of the first unit bases 244. The ring means 251 includes a pair of opposite guide rails 255 provided along the longitudinal direction, three ring base shafts 256 supported by the guide rails 255 for advancing and retreating movement, and a link connection shaft 257 whose one end is rotatabily supported by the link base shaft 256 and other end is slidably and pivotally supported by a guide groove 256a of the adjacent link base shafts 256. The folding body is formed into a thin and long rectangular plate shape, and fixed to the opposite ends of each of the link base shafts 256. An upper end of the folding body 252 constitutes an abutment portion 258. The driving means 2153 is a so-called rodless cylinder and connected to one of the link base shafts 256. The driving means 253 advances and retreats the link base shaft 256 along the longitudinal direction. The operation surface 211 is formed with a groove 211b which is continuous with the retainer opening 211a and in which the folding body 252 can slide.

On the other hand, the second corrugating unit 242 includes a single second unit base 261. The second unit 261 is supported by an intermediate supporting plate 263 through driving means 262. The intermediate supporting plate 263 is supported by a ceiling 215 through driving means 264. An upper portion holding plate 266 located below the second unit base 261 is secured to the intermediate supporting plate 263 through a rod 265. The upper portion holding plate 266 vertically moves relative to the second unit base 261 in accordance with the operation of the driving means 262. Like the first corrugating means 241, mounted to the second base 261 are a pair of front and rear link means 271, a plurality of holding bodies (holding pieces) 272 supported by the ring means 271, and driving means 273 for driving each of the link means 271. Each of the ring means 271 includes three substantially U-shaped link base shafts 276 supported for advancing and retreating movement along the longitudinal direction. The link base shaft 276 is provided at its opposite sides with guide grooves 276a along the vertical direction. A pair of link connection shafts 277 are disposed on each of the opposite sides of the link base shaft 276. One end of each of the link connection shaft 277a is rotatably supported by the link base shaft 276 and the other end is slidably and pivotally supported by a guide groove 276a of the link base shaft 276. An end of the link connection shaft 277 in the folding body 272 is slidably and pivotally supported by a guide groove 279a of a supporting plate 279. Each of the folding bodies 272 is formed into a thin and long rectangular plate shape, and is fixed to lower ends of opposite sides of each of the link base shafts 276. The driving means 273 is a so-called rodless cylinder and connected to a single link base shaft 276. The driving means 273 advances and retreats the link base shaft 256 in the longitudinal direction. The upper portion holding plate 266 is formed with a groove 266b in which the folding body 272 can slide.

As shown in FIG. 19, an airbag supporting body 281 is provided rearward of the retainer opening 211a. The airbag supporting body 281 is supported by the upper end shaft 282, and is driven by driving means (not shown) for abutting against the expanded airbag 202 to support the latter.

As shown in FIG. 28A, a pair of front and rear corrugating hold units 285 are provided along each of the first unit bases 244. Each of the corrugating hold unit 285 includes a holding body 287 which advances and retreats along each of the first unit bases 244 by driving means 286.

The folding apparatus 201 is provided with control means (not shown) for operating various portion associatively.

Next, the folding procedure of the airbag 202 using the folding apparatus 201 will be explained.

First, in the bag set step, as shown in FIGS. 25A and 25B, the retainer 203 is mounted to the retainer receiving jig 221 through the retainer opening 211a in a state in which the airbag 202 is mounted to the retainer 203. Then, the folding apparatus 201 is operated by operating the switches SW1 and SW2. As shown in FIGS. 25C and 25D, air which is pressurizing fluid is charged into the airbag 202 for pressurizing the latter, and the airbag 202 is expanded for carrying out the positioning. At that time, as shown, in FIG. 19, the airbag supporting body 281 advances to prevent the airbag 202 from falling rearward. In this state, the driving means 222 is operated to lower the retainer receiving jig 221, and as shown in FIGS. 25E and 25F, the accommodating space restriction plates 224 advance from the opposite sides to restrict the folding point for dividing the first developing portion 202c and the second developing portions 202d, 202d. In each of steps of the bag set step, the order of the steps may be changed appropriately, or can be carried out concurrently to shorten the operating time. Although the accommodating space restriction plates 224 may be allowed to advance from two directions and the retainer opening 211a can be used for restricting the longitudinal movement of the airbag 202, accommodating space restriction plates which advance into four direction can also be provided for example.

In the subsequent vertically folding step (T-shape folding step, primary folding step), as shown in FIG. 26A, in a state in which the inside of the airbag 202 is kept pressurized, the upper portion holding plate 266 is lowered. As shown in FIGS. 26B, 26C, 26D and 27, with the lowering movement of the upper portion holding plate 266, the vertical first developing portion restriction plate 236 and the horizontal second developing portion restriction plate 238 are allowed to advance and lower. In a state shown in FIG. 26C, the pressurizing operation of the airbag 220 is stopped. In a state shown in FIG. 26D, the inside of the airbag 202 is brought into negative pressure, and the airbag 202 is folded into a substantially T-shape having the first developing portion 202c which is continuous with the opening 202a and the second developing portions 202d, 202d extending forward and rearward from the tip end of the first developing portion 202c.

At the time of the vertically folding step, internal pressure is applied to the airbag 202, and the upper portion holding plate 266 and each of the restriction plates 236, 238 abut against the airbag 202 such as to surround the latter. Therefore, the airbag 202 is folded such as to follow the movement of the upper portion holding plate 266 and each of the restriction plates 236, 238 in a state in which the position of the airbag 202 is restricted. Therefore, by adjusting and controlling the positions and the moving speed of the upper portion holding plate 266 and each of the restriction plates 236, 238 by driving means 234, 237 and 239 such as NC (numerically controlled) motors, it is possible to fold the airbag 202 without deviating the point 202T at which the upper portion holding plate 266 and each of the restriction plates 236, 238 abut against the airbag 202. That is, each of the restriction plates 236 and 238 are not in slide contact with the airbag 202, and it is possible to restrain a force greater than a predetermined value from being applied to the base cloth of the airbag 202.

In the subsequent corrugating step (secondary folding step), as shown in FIG. 28A, the first corrugating unit 241 rises from the below and the second corrugating unit 242 is lowered from the above in a state in which the folding bodies 252 and 272 (abutment portions 58, 78) are separated away from each other. At that time, the retainer receiving jig 221 slightly rises.

Then, as shown in FIG. 28B, each of the restriction plates 236 and 238 retreat sideways, the folding bodies 252 and 272 are inserted through the groove 211b of the operation surface 211 and the groove 266b of the upper portion holding plate 266, and the abutment portions 258 and 278 abut against the base cloth of the airbag 202. Further, the first corrugating unit 241 rises and the second corrugating unit 242 is lowered, and both the corrugating units 241 and 242 press the airbag 202. Then, the driving means 253 and 273 are operated to operate pantagraph-like link means 251 and 271, a distance (separating size) between the adjacent abutment portions 258 and 278 is simultaneously shortened, the second developing portions 202d, 202d are folded into corrugate shape and gathered toward the first developing portion 202c to form the aggregate 202e. In this state, each of the abutment portions 258 and 278 fold the airbag 202 without deviating the point at which the abutment portions abut against the airbag 202. That is, each of the abutment portions 258 and 278 is not in slide contact with the airbag 202, and it is possible to restrain a force greater than a predetermined value from being applied to the base cloth of the airbag 202.

After the corrugating folding step is completed, as shown in FIG. 28C, the holding body 287 of each of the corrugating hold units 285 advances and sandwiches the folded aggregate 202e and holds the latter.

Next, as shown in FIG. 28D, in a state in which the shape is kept by the corrugating hold unit 285, the first corrugating unit 241 retreats downward, and the second corrugating unit 242 (upper portion holding plate 266) retreats upward.

In this state, the operator appropriately operates the switch and the like to retreat the holding body 287 of the corrugating hold unit 285 to take the retainer 203 together with the folded airbag 202 out from the folding apparatus 201.

Lastly, the operator winds the first developing portion 202c around the aggregate 202e, and manually carries out the accommodation step for accommodating the airbag 202 into the accommodation portion 204 of the retainer 203.

According to the present embodiment, as described above, it is possible to mechanize the folding operation of the airbag 202 having excellent developing characteristics that when the gas flows in, the first developing portion 202c first develops and then, the plurality of second developing portions 202d, 202d develop and thus, it is possible to reduce the production cost.

When the first developing portion 202c, the second developing portions 202d, 202d, and the aggregate 202e, the plurality of jigs abutting against the base cloth of the airbag 202 restrain the base cloth of the airbag 202 and move together with the base cloth and thus, the airbag can be folded at equal distances neatly. Further, since the jigs are not in slide contact with the base cloth, it is possible to restrain a great force from being applied. Therefore, it is possible to increase the speed of the folding operation and to reduce the producing cost of the airbag 202. Furthermore, it is possible to reduce the producing cost of the folding apparatus 201 without requiring a great force for driving system such as driving means.

In the first and second corrugating units 241 and 242 for folding the aggregate 202e, each of the folding bodies 252 and 272 are associatively operated using the pantagraph-like link means 251 and 271. Therefore, it is possible to realize the link means 251 and 271 capable of simultaneously changing the distance between the plurality of the folding bodies 252 and 272 with a simple structure. Further, the driving means 53 and 73 can also be omitted. Therefore, it is possible to reduce the producing cost of the folding apparatus 201 by simplifying the structure.

In the above embodiment, each of the first and second developing portion holding means 231 and 232 has the single first or second developing portion restriction plate 236 or 238, but each of the first and second developing portion holding means 231 and 232 can be provided with a plurality of associatively operated restriction plates. For example, as shown in FIG. 29, upper and lower second developing portion restriction plates 238a and 238b can be provided, a distance between these second developing portion restriction plates 238a and 238b can be changed by driving means 291 using a ball screw or the like, and the base cloth can be folded into the corrugated shape while restraining the sliding contact with the base cloth.

In the above embodiment, the driving means 245 and 264 for vertically moving the link means 251 and 271 themselves are provided for the first and second corrugating units 241 and 242 of the aggregate folding means 240, but instead of them, it is also possible to vertically move the folding bodies 252 and 272 by the operation of the ring means themselves. For example, as shown in FIG. 30, a driving operating point of the driving means 273 comprising a rodless cylinder or the like and a link center point 293 rotatably connecting the link connection shafts 257 are connected. With this operation, when the driving means 273 is operated, if the driving means moves from the initial position shown in FIG. 30A to the fully closed position shown in FIG. 30C through an intermediate position shown in FIG. 30B, the size L from the driving means 273 to the abutment portion 278 of the folding body 272 is increased, and the abutment portion 278 is projected. With this structure, since the driving means is omitted, the structure is simplified, and the producing cost of the folding apparatus 201 is reduced.

Each of the driving means in the above embodiment can appropriately use a ball screw or the like driven by an air cylinder, a hydraulic pressure cylinder or a motor.

The folding apparatus 201 of the airbag 202 in which the two second developing portions 202d, 202d are extended from the first developing portion 202c has been explained in the above embodiment. However, the folding apparatus 201 of the present embodiment can also be applied to an airbag for a passenger's seat of a different structure. Further, the folding apparatus 201 can be applied to an airbag of an airbag apparatus for a driver's seat provided in a steering wheel, an airbag apparatus for a rear seat provided in a back portion of a seat, and an airbag apparatus for protecting an object to be protected which is provided in other than an automobile.

What is claimed is:

1. A folding method for an airbag which is developed from an airbag accommodation portion by flowing-in of gas, comprising:

a first step including folding the airbag into a shape including a first developing portion and two second developing portions, the first developing portion being provided at one end with an opening, and each of the second developing portions extending from a second end of the first developing portion, each of the first and second developing portions being folded into a width capable of being accommodated in the airbag accommodation portion;

a second step including folding the second developing portions and superposing the second developing portions onto the second end of the first developing portion, thereby forming an aggregate; and a third step including winding the first developing portion around an outer periphery of the aggregate to accommodate the first developing portion in the airbag accommodation portion.

2. A folding method for an airbag which is developed from an airbag accommodation portion by flowing-in of gas, comprising:

a first step including folding the airbag such that an opening of the airbag is directed downward;

a second step including pressurizing an inside of the airbag to expand the airbag upward in substantially vertical direction;

a third step including folding the airbag into a substantially T-shape comprising a first developing portion and two second developing portions, the first and second developing portions formed by pressing the expanded airbag inward, one end of the first developing portion having the opening and a second end portion of the first developing portion connecting with the second developing portions having a flat plate shape extending substantially horizontally from the second end of the first developing portion, each of the first and second developing portions being folded into a width capable of being accommodated in the airbag accommodation portion; and a fourth step including folding the second developing portions and superposing the second developing portions onto the second end of the first developing portion, thereby forming an aggregate; and, a fifth step including winding the first developing portion around an outer periphery of the aggregate to accommodate the first developing portion in the airbag accommodation portion.

* * * * *